(12) United States Patent
Oshima

(10) Patent No.: US 10,175,971 B2
(45) Date of Patent: Jan. 8, 2019

(54) DISTRIBUTION SYSTEM, DISTRIBUTION METHOD, AND PROGRAM

(71) Applicant: CANON KABUSHIKI KAISHA, Tokyo (JP)

(72) Inventor: Keita Oshima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/216,401

(22) Filed: Jul. 21, 2016

(65) Prior Publication Data

US 2017/0031675 A1   Feb. 2, 2017

(30) Foreign Application Priority Data

Jul. 30, 2015 (JP) ................. 2015-150554

(51) Int. Cl.
G06F 8/65 (2018.01)
H04L 29/08 (2006.01)

(52) U.S. Cl.
CPC ............ G06F 8/65 (2013.01); H04L 67/10 (2013.01)

(58) Field of Classification Search
CPC ...................................... G06F 8/65
See application file for complete search history.

(56) References Cited

U.S. PATENT DOCUMENTS

| | | | | |
|---|---|---|---|---|
| 7,398,511 B2 * | 7/2008 | El-Shimi | ............ | G06F 11/3604 709/224 |
| 8,868,441 B2 * | 10/2014 | Bobak | ............ | G06Q 10/0633 705/7.27 |
| 2004/0019889 A1 * | 1/2004 | Melchione | ............ | G06F 8/61 717/177 |
| 2006/0130046 A1 * | 6/2006 | O'Neill | ............ | G06F 8/65 717/168 |
| 2008/0307033 A1 * | 12/2008 | Matsuda | ............ | H04N 7/173 709/201 |
| 2009/0161143 A1 * | 6/2009 | Nakamoto | ............ | G06F 11/1433 358/1.14 |

(Continued)

FOREIGN PATENT DOCUMENTS

JP   2011-002874 A   1/2011

*Primary Examiner* — Chat C Do
*Assistant Examiner* — Douglas M Slachta
(74) *Attorney, Agent, or Firm* — Cowan, Liebowitz & Latman, P.C.

(57) ABSTRACT

When applications in multiple devices are collectively, remotely updated, the applications cannot be uniformly determined to be activated and stopped because the execution states are different between devices and between applications. A distribution system obtains identification information and version information on each of firmware and an application that are installed in a network device, switches between a first screen for distribution setting pertaining to the firmware and a second screen for distribution setting pertaining to the application, based on the information obtained, and displays the screen, and transmits, to the network device, any of the distribution setting pertaining to the firmware designated through the first screen and the distribution setting pertaining to the application designated through the second screen. The distribution setting of the application transmitted includes designation of the operating state of the application after distribution.

7 Claims, 21 Drawing Sheets

(56) References Cited

U.S. PATENT DOCUMENTS

| | | | |
|---|---|---|---|
| 2009/0216830 A1* | 8/2009 | Inoue | H04L 67/104 709/201 |
| 2010/0188676 A1* | 7/2010 | Ohashi | G06F 3/1205 358/1.15 |
| 2011/0010703 A1* | 1/2011 | Matsuda | G06F 8/65 717/178 |
| 2011/0276956 A1* | 11/2011 | Yuki | G06F 8/65 717/170 |
| 2013/0179872 A1* | 7/2013 | Kuzmack | G06F 8/65 717/171 |
| 2013/0194630 A1* | 8/2013 | Kishimoto | G06F 3/1296 358/1.15 |
| 2013/0235405 A1* | 9/2013 | Hayami | H04N 1/00928 358/1.13 |
| 2014/0047427 A1* | 2/2014 | Evans | G06F 8/654 717/168 |
| 2014/0373002 A1* | 12/2014 | Suwabe | G06F 8/65 717/171 |
| 2015/0040187 A1* | 2/2015 | Fujii | H04L 63/08 726/3 |

* cited by examiner

FIG. 8

SEARCH CONDITION

| DISTRIBUTION TYPE | ○ FIRMWARE DISTRIBUTION  ● APPLICATION DISTRIBUTION |
| --- | --- |
| FIRMWARE VERSION (PARTIAL MATCH) | |
| APPLICATION NAME (PARTIAL MATCH) | |
| APPLICATION VERSION (PARTIAL MATCH) | |
| DEVICE MODEL NAME (PARTIAL MATCH) | |

[FIND] [UPLOAD]

| LIST FILE | [BROWSE...] |
| --- | --- |

| | CUSTOMER NAME | DEVICE ID | MODEL | FW VERSION | APPLICATION NAME | APPLICATION ID | APPLICATION VERSION | STATE | LICENSE RESIDUAL NUMBER |
| --- | --- | --- | --- | --- | --- | --- | --- | --- | --- |
| ☐ | Oosima | ABC111111 | ABC2100 | 10.01 | PRINT MANAGEMENT | PQR12345 | 3.00 | ACTIVE | N/A |
|   |        |           |         |       | SCAN | STU12345 | 3.00 | STOP | 143 |
| ☑ | Oosima | DEF222222 | XYZ3000 | 10.01 | PRINT MANAGEMENT | PQR12345 | 3.00 | UNIDENTIFIED | N/A |
|   |        |           |         |       | SCAN | STU12345 | 3.00 | STOP | 143 |
|   |        |           |         |       | LOGIN | LMN12345 | 2.00 | ACTIVE | N/A |
| ☐ | Oosima | DEF333333 | XYZ3000 | 10.01 | PRINT MANAGEMENT | PQR12345 | 3.00 | ACTIVE | 143 |
| ☑ | Oosima | DEF444444 | XYZ3000 | 10.01 | SCAN | STU12345 | 3.00 | ACTIVE | N/A |
| ☑ | Oosima | DEF444449 | XYZ3000 | 10.01 | LOGIN | LMN12345 | 3.00 | ACTIVE | 143 |
| ☐ | Oosima | DEF555555 | XYZ3000 | 10.01 | PRINT MANAGEMENT | PQR12345 | 3.00 | STOP | N/A |
|   |        |           |         |       | SCAN | STU12345 | 3.00 | UNIDENTIFIED | 143 |
| ☐ | Oosima | DEF555559 | XYZ3000 | 10.01 | LOGIN | LMN12345 | 1.00 | STOP | N/A |
|   |        |           |         |       | PRINT MANAGEMENT | PQR12345 | 3.00 | ACTIVE | 143 |
|   |        |           |         |       | SCAN | STU12345 | 3.00 | ACTIVE | N/A |

[NEXT]

DISTRIBUTION SYSTEM, DISTRIBUTION METHOD, AND PROGRAM

BACKGROUND OF THE INVENTION

Field of the Invention

The present invention relates to a distribution system that manages and distributes application software installed in clients, such as devices, and firmware, and to its distribution method.

Description of the Related Art

A device, such as an MFP (multifunction printer/peripheral), can use two types of software including firmware that achieves device-intrinsic embedded functions, and applications that are installed afterward and used on a user-by-user basis. In general, the applications are selected, installed and activated by users. Some applications require additional charges (licenses) for use.

The firmware and applications are sometimes updated for correcting malfunctions and extending the functions. In a version upgrade, updated versions are sometimes installed not only in the firmware but also in the applications by manufacturers or vendors of the devices. Furthermore, in software installation and update to upgraded version software, devices are connected to a distribution server via a network, and the software is distributed from a remote place in some cases. Here, in version upgrade of always-on software, such as firmware, the software is always in an operating state even after the software update. Accordingly, even in distribution from a remote place, the software is controlled so as to be in an active state after the update. As to active state control during software update, a technique is proposed that controls whether to reboot the system in the update or not (e.g., Japanese Patent Application Laid-Open No. 2011-2874).

SUMMARY OF THE INVENTION

The activation state after update is required to be designated in some cases when a manufacturer or vendor of devices distributes an application from a remote place. For example, in the case of an application to which initial setting is performed in activation, the application is desired to be securely activated after update. In the case where firmware or another application is required to be updated in synchronization with update of the application concerned, this application may be updated and kept in a stop state until the other software is updated.

However, the applications operating on device are in different execution states (whether to be active or stopped) depending on the respective devices. The reasons for the differences are various with respect to the users of the devices. In the case where the application is installed, an active state is normal. However, for example, in the case of using an application according to a license that limits the usable days, the user may keep the application stopped unless the user actually uses the application because the user does not desire to expend the license unnecessarily. Meanwhile, in the case of an application that is apparently malfunctioning, the user may maintain the application in the stop state until the malfunction is solved. In such cases, it is appropriate to make the application get into the active state after update to a version where the malfunction is corrected. Consequently, the manufacturer or vendor of the devices cannot uniformly determine the activation and stop conditions after the update in distribution from a remote place.

The present invention therefore has an object to achieve appropriate control of the activation states after application update for respective devices in collective remote distribution to the devices.

To solve the above problem, the present invention provides a distribution system including: an obtaining unit that obtains identification information and version information on each of firmware and an application that are installed in a network device; a display unit that switches between a first screen for distribution setting pertaining to the firmware and a second screen for distribution setting pertaining to the application, based on the information obtained by the obtaining unit, and displays the screen; and a transmission unit that transmits, to the network device, any of the distribution setting pertaining to the firmware designated through the displayed first screen and the distribution setting pertaining to the application designated through the displayed second screen, wherein the distribution setting pertaining to the application transmitted includes designation of an operating state of the application after distribution.

Even when the activation states of the applications installed in the respective devices are different from each other, the activation states after application update in the devices can be appropriately controlled in collective remote distribution to the multiple devices. Consequently, version update operations for applications in management of multiple devices by a service person become efficient. As a result, the maintenance states of a number of devices are improved.

Further features of the present invention will become apparent from the following description of exemplary embodiments with reference to the attached drawings.

BRIEF DESCRIPTION OF THE DRAWINGS

FIG. 8 illustrates a screen example of selecting an application to be distributed and selecting the target device in the application distribution setting in Embodiment 1.

DESCRIPTION OF THE EMBODIMENTS

Preferred embodiments of the present invention will now be described in detail in accordance with the accompanying drawings.

Embodiments for implementing the present invention are hereinafter described with reference to the drawings. Note that in the description of the flowcharts, each step is represented with a prefix 'S'.

Embodiment 1

Figure 1:
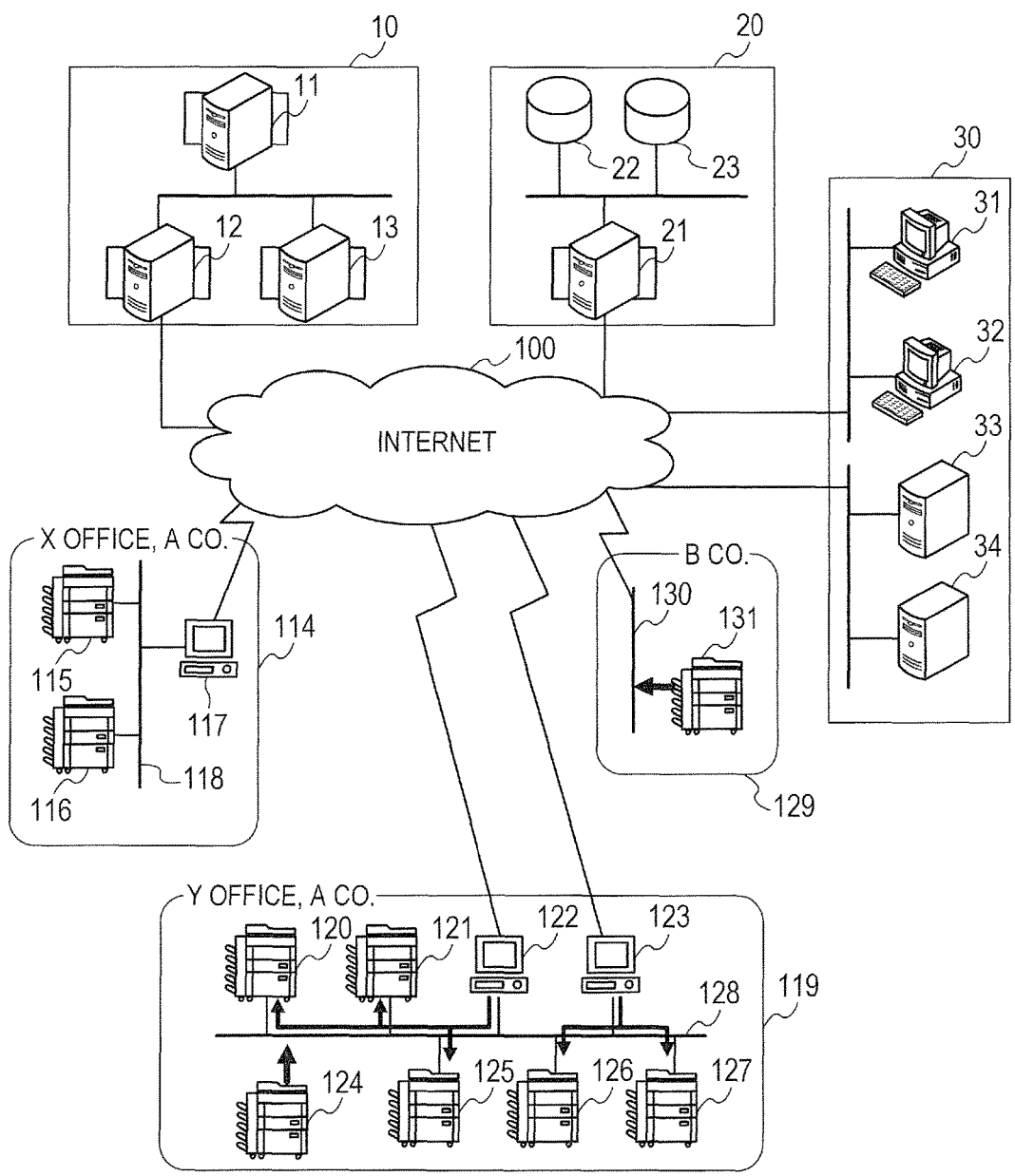
FIG. 1 is a system configuration diagram in Embodiment 1.

FIG. 1 is a block diagram illustrating a system configuration in Embodiment 1. A distribution system 10 includes a web server 12, a DB server 13 and an application server 11. The web server 12 is connected to the Internet 100. The distribution system 10 communicates, via the web server 12, with devices 115 to 117 of a customer company 114, devices 120 to 127 of a customer company 119, and a device 131 of a customer company 129. Distribution control for application software (hereinafter, abbreviated as "application") and firmware (hereinafter, abbreviated as "FW") is thus performed.

Actual files of the application and FW are in a content server 20. When the application is installed in the device, position information on the actual file on the content server 20 is obtained from the distribution system 10 and the application is downloaded from the content server 20. Thus, the load of application distribution to many devices can be distributed, and the application can be efficiently distributed. Update of the application and FW is performed in an analogous manner. The content server 20 includes a content management server 21 and file storages 22 and 23. The content management server 21 stores or provides file content, i.e., the application and FW, in response to a request from the outside.

The devices of the customer companies include multi-function printers (MFPs) and single-function printers (SFP). According to each model of devices, one or more functions are embedded. Installation of FW for achieving these functions enables the respective functions of the devices to be used. Applications that are executable on a model-by-model basis or common to the models of the devices can be installed and executed. Each application can be executed and stopped independently of the FW of the device. The user of the device selects a desired application from among applications usable by the device, and obtains a license through purchase to thereby install the application. When the malfunction of the application in the device is corrected or when the function is improved or added, the function and application can be used by updating the application.

This embodiment exemplifies the MFP and SPF as devices. However, the devices are not limited to this example. That is, while the application is automatically distributed by the distribution system 10, the technique of the present invention is effective on any device only if the device can use an application which can be installed, uninstalled, activated and stopped independently of the function intrinsic to the device main body. Other examples where the present invention is effective include Internet-connected home electrical appliances, vehicles where multiple electric control devices are embedded, and mobile phones.

A vendor system 30 sells the devices to the customer companies 114, 119 and 129. Manufacturers of the devices to be maintained and managed or the vendors of the devices perform operations for registering and managing applications and FW. The vendor system 30 includes one or more PCs 31 and 32 and servers 33 and 34. Through access from the vendor system 30 to the distribution system 10 and the content server 20, the application and FW are registered and the distribution setting is performed.

Figure 2:
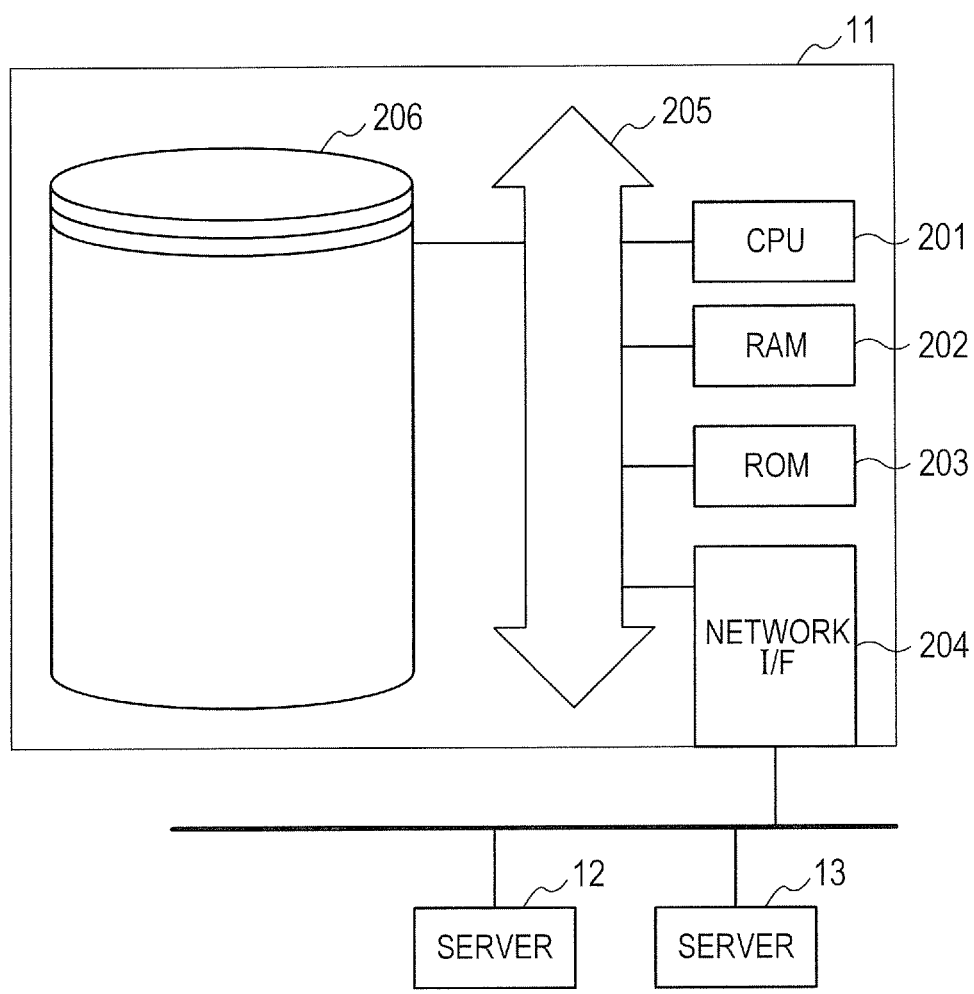
FIG. 2 illustrates a hardware configuration of a server in Embodiment 1.

FIG. 2 is a block diagram illustrating a hardware configuration in this embodiment. The application server 11 includes a CPU 201, a RAM 202, a ROM 203, a network interface 204 and an HDD 206, which are connected via a bus 205. The application server 11 is mutually connected to the web server 12 and the DB server 13 via the network interface 204. The distribution system 10 is achieved by reading data and programs recorded in the HDD 206, ROM 203 and RAM 202 and causing the CPU 201 to execute the programs. The function may be achieved in cooperation between functions of servers in some cases. The network interface 204 is used for functional cooperation between the servers in the distribution system 10, and also for communication with an external system via the Internet 100. The illustration of FIG. 2 corresponds to the application server 11. It is assumed that the device also has an analogous hardware configuration.

Figure 3:
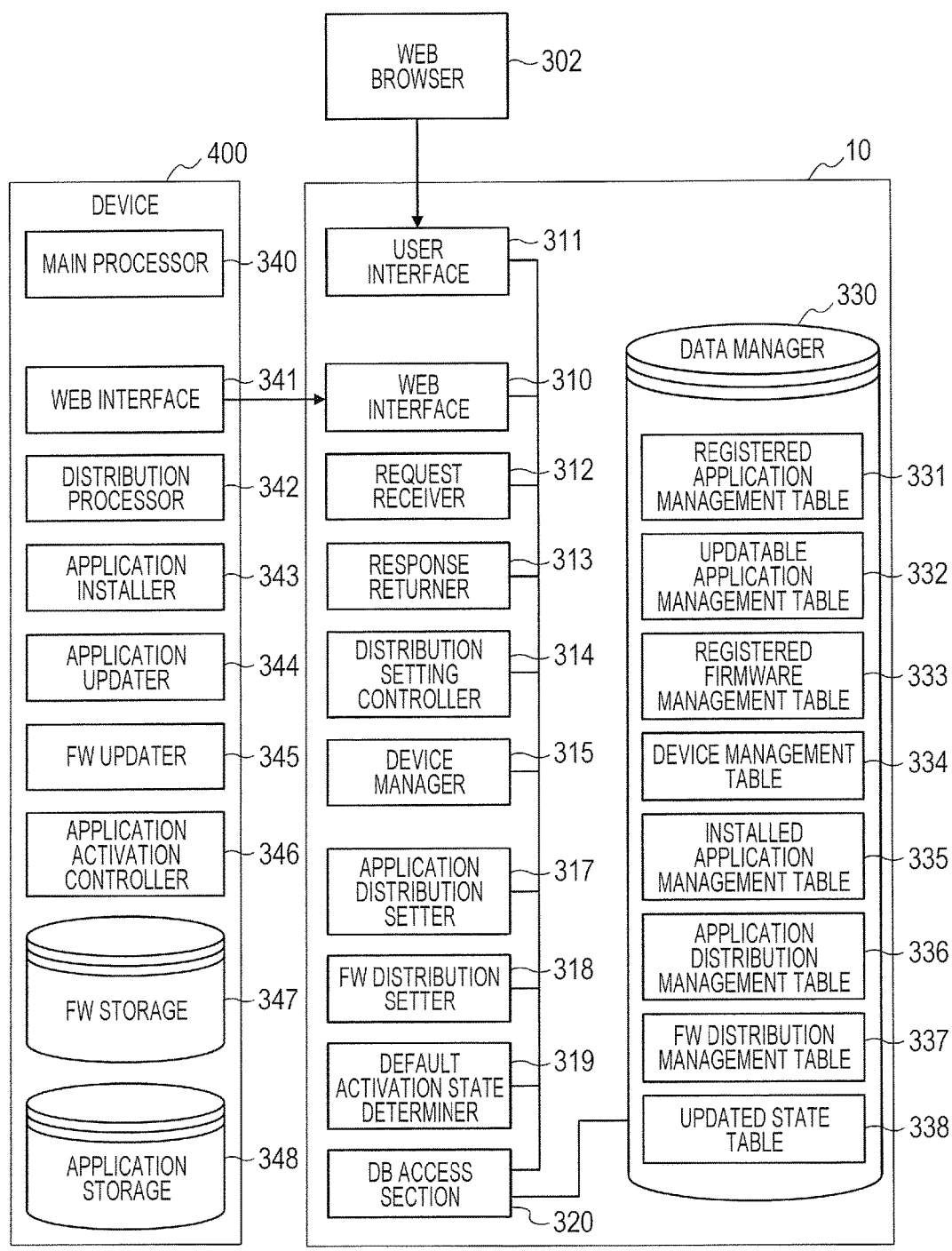
FIG. 3 is a functional block diagram of a distribution system and a device in Embodiment 1.

FIG. 3 is a block diagram illustrating the functional configuration of the distribution system 10 according to this embodiment. The device (network device) 400 is an example of the device connected to the distribution system 10. The web browser 302 is a client system, which is an example of the vendor system connected to the distribution system 10.

A web interface 310 provides a function of distributing an application and FW to the device 400. This interface receives various requests from the devices, and returns processed results. For example, upon receipt of the request for application distribution information, this interface retrieves a site where a target application is stored, and returns the retrieved result as a URL for obtaining the application. The details of processing the request are described later.

A user interface 311 accesses the distribution system, and registers the application and FW and performs distribution setting. A request receiver 312 receives a request issued by the device. A response returner 313 returns a response to the device. A distribution setting controller 314 controls the distribution setting of the FW and application. This controller controls a device manager 315, an application distribution setter 317 and an FW distribution setter 318, and determines the content of output on a screen for distribution setting to be displayed on the user interface 311. A default activation state determiner 319 is revoked by the application distribution setter 317 and determines the default activation state.

A DB access section 320 updates and retrieves the data on the following tables managed by a data manager 330, according to various processes. That is, the tables include a registered application management table 331, an updatable application management table 332, a registered firmware management table 333, a device management table 334, an installed application management table 335 and an application distribution management table 336. Furthermore, the tables include an FW distribution management table 337 and an updated state table 338.

The configuration of the device 400 is as follows. The main processor 340 processes main functions intrinsic to the device 400 (e.g., image forming process in the case of a printer). The device 400 includes not only this main function but also functions for distribution control of the FW and application of the device. The functions are processed by the following functional blocks 341 to 348.

A block 341 indicates a web interface for receiving distribution of the application and FW from the distribution system 10, and is connected to the web interface 310 of the distribution system 10. A block 342 indicates a distribution processor. A block 343 is an application installer. A block 344 indicates an application updater. A block 345 indicates an FW updater. A block 346 indicates an application activation controller. A block 347 indicates an FW storage that stores the distributed FW. A block 348 indicates an application storage that stores the distributed application.

Figure 4:
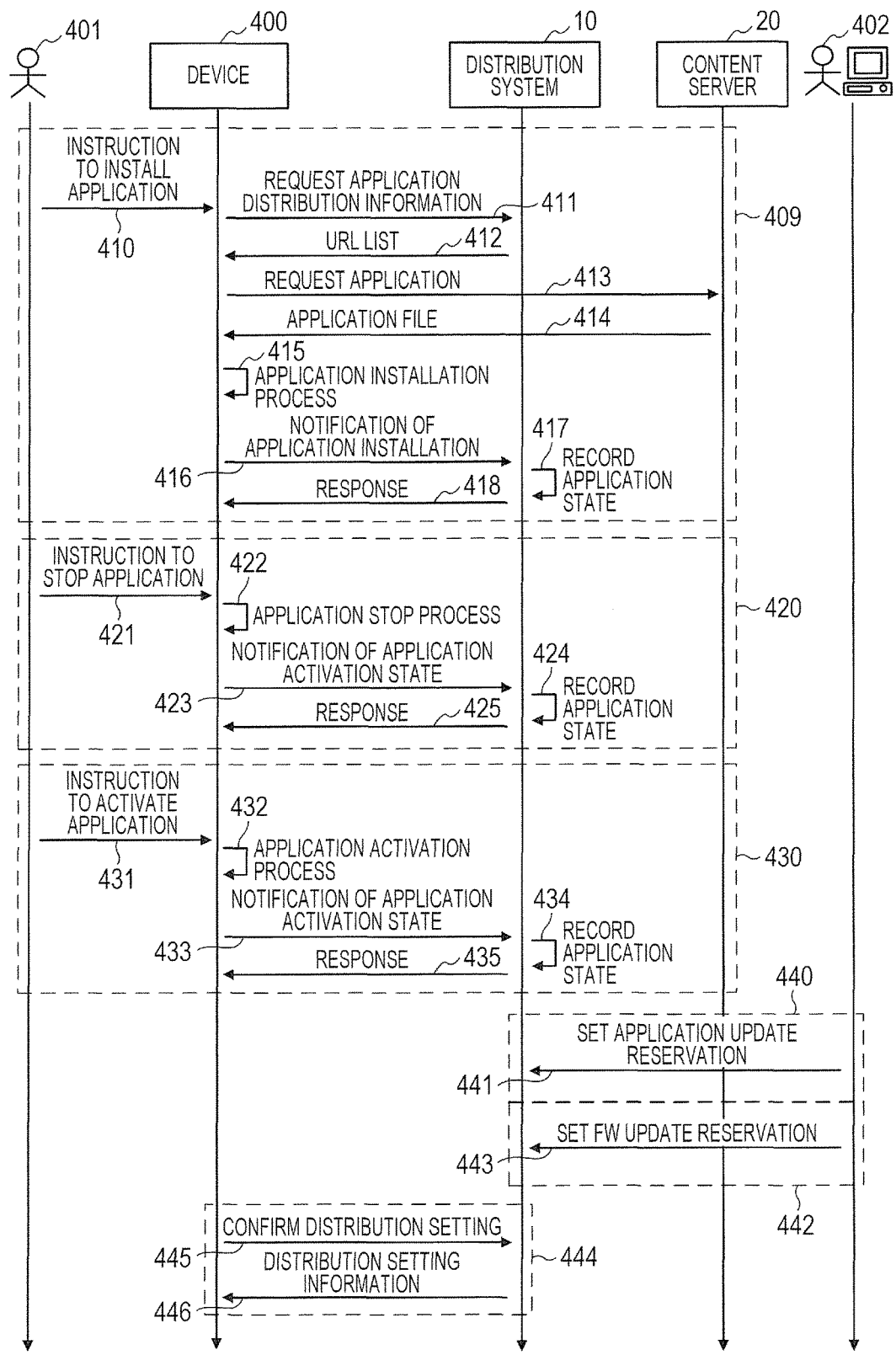
FIG. 4 illustrates a communication sequence example of the distribution system in response to operations by a user and a service person in Embodiment 1.

FIG. 4 is a sequence diagram illustrating an example of a flow when the device and the distribution system are operated through operations by the service person who maintains and manages the device to install or update the application and FW of the device and by the user of the device. The user 401 uses the device 400, and the service person 402 performs a setting operation on the distribution system 10 for remote distribution to update the application and FW of the device 400.

A range encircled by broken lines 409 indicates a sequence in the case where the user 401 installs a new application. The user 401 operates a user interface of the device 400 to install the new application into the device 400, and issues an instruction of installing the application (410). According to this instruction, the device 400 transmits information identifying the application to be installed, to the distribution system 10, and requests the identified application (411). According to this request, the distribution system 10 causes the web interface 310 to process the request issued by the device 400. The web interface 310 searches the registered application management table 331 for the URL of the application, based on any of the application name and application ID, which have been passed through the request. The distribution system 10 returns, to the device 400, the retrieved URL as the URL for downloading the program file (412). The description is hereinafter made assuming that the request that has been issued by the device 400 and is to be processed in the distribution system 10 is processed specifically by the web interface 310.

The device 400 accesses the content server 20 based on the returned URL, and requests the file of the application to be installed (413). The device 400 performs a process of installing the application using the file of the application obtained through the response (414) (415). After the installation process is finished and the installed application is activated, the device 400 notifies the distribution system 10 of the installation of the new application (416). Upon receipt of the application installation notification from the device 400, the distribution system 10 records the notification and updates information on the application currently installed in the device (417). At this time, the fact is also stored that the operation state (operating state) of the target application in the target device having received the notification is "Active". After recording the state of the application, the distribution system 10 returns a response to the device 400 (418).

Next, a range encircled by broken lines 420 indicates a sequence in the case where the user 401 stops the installed application. When the user 401 intends to stop the operation of the application because of a certain reason after the installation of the application, the user 401 operates the user interface of the device 400 and issues an application stop instruction (421). According to this instruction, the device 400 stops the execution of the target application (422). The device then notifies the distribution system 10 of the state of this application, specifically notifying the system that the state has become the stop state (423). The distribution system 10, having received the stop notification, records the notification and updates the information on the currently installed application to the operation state of the target application which is "Stop" (424). The system then returns a response to the device 400 (425).

A range encircled by broken lines 430 indicates a sequence in the case where the user 401 reactivates the stopped application. The user 401 operates the user interface of the device 400 and issues an application activation instruction (431). According to this instruction, the device 400 starts the execution of the target application (432). The device then notifies the distribution system 10 of the state of this application, specifically notifying the system that the state has become the active state (433). The distribution system 10, having received the activation notification, records the notification and updates the information on the currently installed application to the operation state of the target application which is "Active" (434). The system then returns a response to the device 400 (435).

Processes of the ranges encircled by the broken lines 420 and 430 can be executed at any time according to the intention of the user. The distribution system 10 updates application state information in the distribution system 10, as required, according to the application activation state notifications (423 and 433).

A range encircled by broken lines 440 indicates an operation by the service person 402 on distribution reservation setting 441 for application update. A range encircled by broken lines 442 indicates an operation by the service person 402 on distribution reservation setting 443 for FW update. The processes of the ranges of the broken lines 440 and 442 can be executed at any time by the service person 402. However, the range of the broken lines 440 requires that the application to be set has been installed in the target device. The description of this embodiment assumes that the processes of the ranges of the broken lines 440 and 442 are executed exclusively from each other. Alternatively, both processes may be executed at the same time.

A range encircled by broken lines 444 indicates a distribution setting confirmation sequence where the device 400 periodically queries the distribution system 10. The device 400 queries the distribution system 10 whether there is application update or FW update setting for the device 400 or not, at a predetermined period or a determined timing (445). The distribution system 10 returns, as a response, the presence or absence of the application update or FW update distribution setting, and the distribution setting information in the case of presence, to the device 400 (446).

Figure 5:
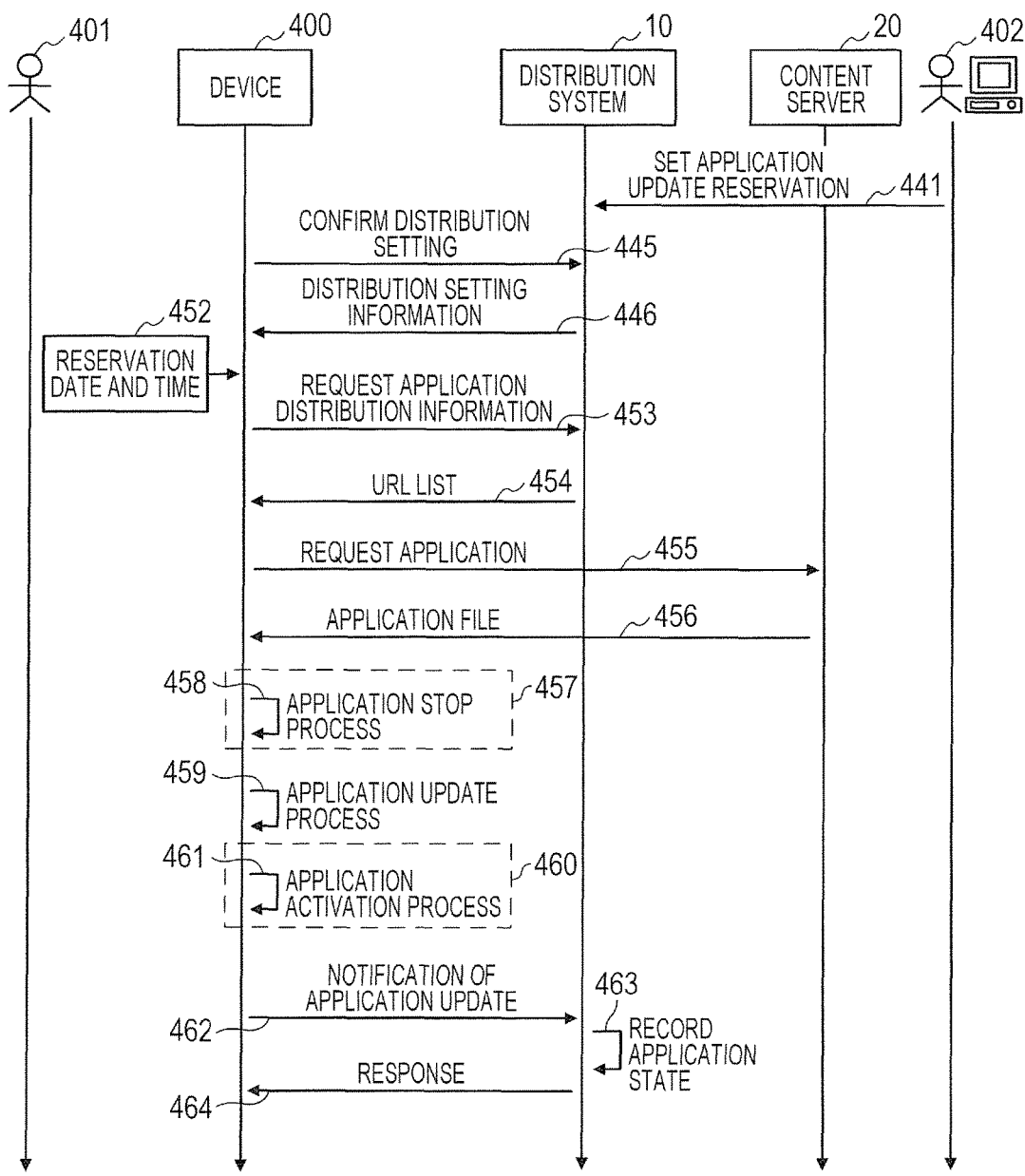
FIG. 5 is a distribution sequence example of application update in Embodiment 1.

FIG. 5 is a sequence diagram illustrating a flow in the case of presence of the application update distribution setting. Processes 441, 445 and 446 indicate the same sequences as the sequences with the same numerals illustrated in FIG. 4. First, when the service person 402 sets an application update reservation (441), the distribution system 10 returns distribution setting information through subsequent distribution setting confirmation from the device 400 (445) (446). The distribution setting information returned here includes distribution date and time information, distribution identification information, and execution state instruction information after update. When the reserved distribution date and time (452) is reached, the device 400 transmits the distribution identification information to the distribution system 10 and requests the corresponding application (453). Upon this request, the distribution system 10 searches the application distribution management table 336 based on the distribution identification information passed through the request, identifies the application ID and version, and further searches the registered application management table 331 for the URL of the application. The distribution system 10 returns, to the device 400, the retrieved URL as the URL for downloading the program file (454). The device 400 accesses the content server 20 based on the returned URL, and requests the file of the application to be installed (455). The content server 20 returns the file of the application to the device 400 (456).

The presence and absence of a process of a range encircled by broken lines 457 is changed according to the operation state of the target application in the device. When the update target application is in operation, the device 400 stops the target application (458). Subsequently, the device performs a process of updating the application using the file of the application obtained through the response (456) (459).

The details of the process of a range encircled by broken lines 460 are changed according to the distribution setting information obtained in the process 446. When the execution state instruction after update for the obtained distribution setting information is for making the application in the active state, the process of activating the target application is performed after the update process (461). Subsequently, the device 400 notifies the distribution system 10 of the completion of updating the application and the execution state after update (462). The distribution system 10, having been notified of the update, records the notification and updates the operation state of the target application (463). The system then returns a response to the device 400 (464).

Figure 6:
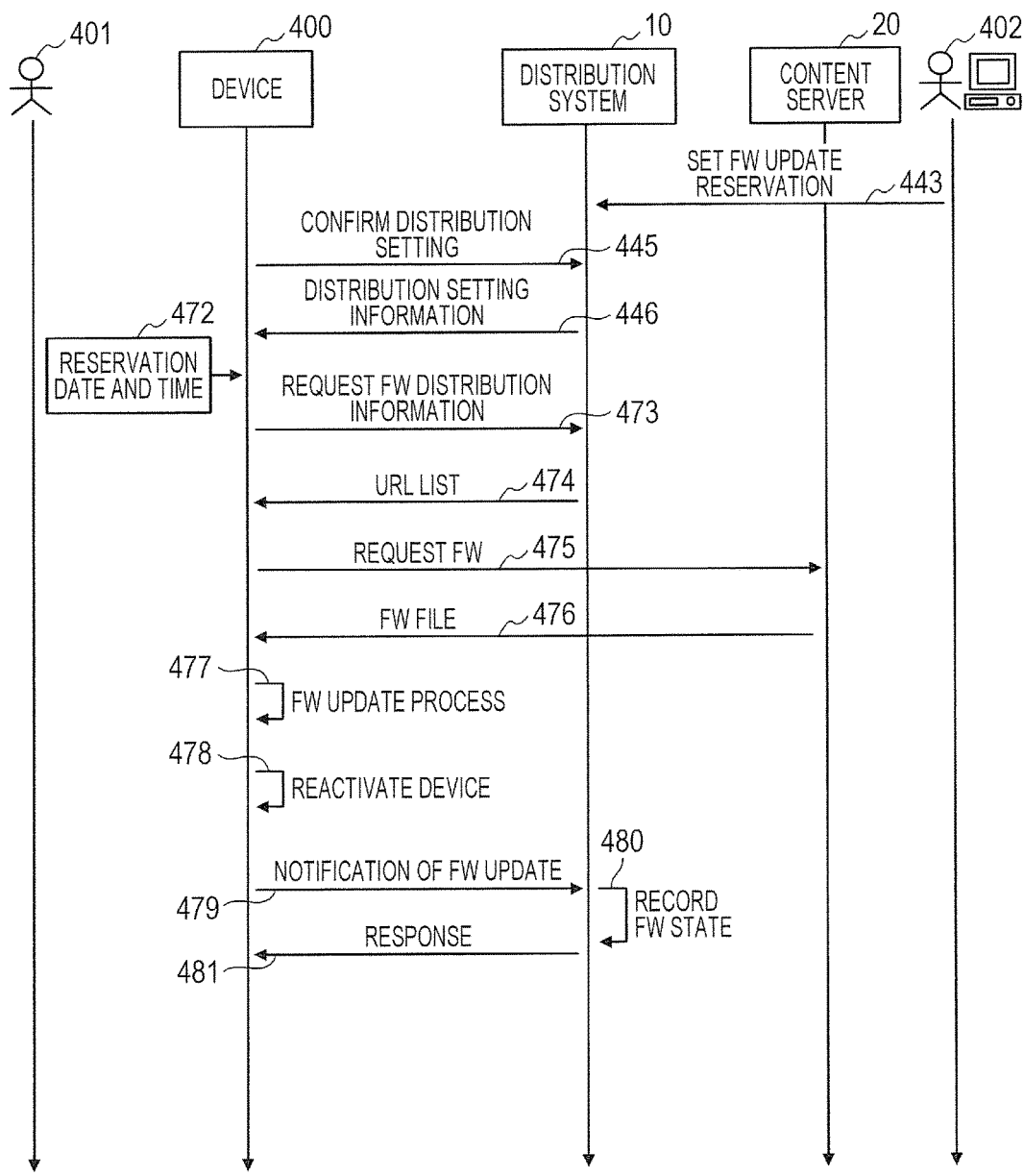
FIG. 6 is a distribution sequence example of firmware update in Embodiment 1.

FIG. 6 is a sequence diagram illustrating a flow in the case of presence of the FW update distribution setting. Processes 443, 445 and 446 indicate the same sequences as the sequences with the same numerals illustrated in FIG. 4. First, when the service person 402 sets an FW update reservation (443), the distribution system 10 returns distribution setting information through subsequent distribution setting confirmation from the device 400 (445) (446). The distribution setting information returned here includes distribution date and time information, and distribution identification information. When the reserved distribution date and time (472) is reached, the device 400 transmits the distribution identification information to the distribution system 10 and requests the corresponding FW (473). Upon this request, the distribution system 10 searches the FW distribution management table 337 based on the passed distribution identification information, identifies the version, and further searches the registered firmware management table 333 for the URL of the FW. The distribution system 10 returns, to the device 400, the retrieved URL as the URL for downloading the program file (474).

The device 400 accesses the content server 20 based on the returned URL, and requests the file of the FW to be installed (475). The content server 20 returns the required file to the device 400 (476). The device 400 uses the file of the FW obtained through the response (476), performs the FW update process (477) and reactivates the FW (478). After reactivation, the device 400 includes version information after update into FW update notification, and transmits this notification to the distribution system 10 (479). The distribution system 10 updates the device management table 334, based on information on the version after update passed through the update notification from the device 400. The information that is on the current version of FW of the device 400 and is held in the distribution system 10 is updated. The distribution system 10 returns a response to the device 400 (481), and this sequence is thus finished.

Figure 7:
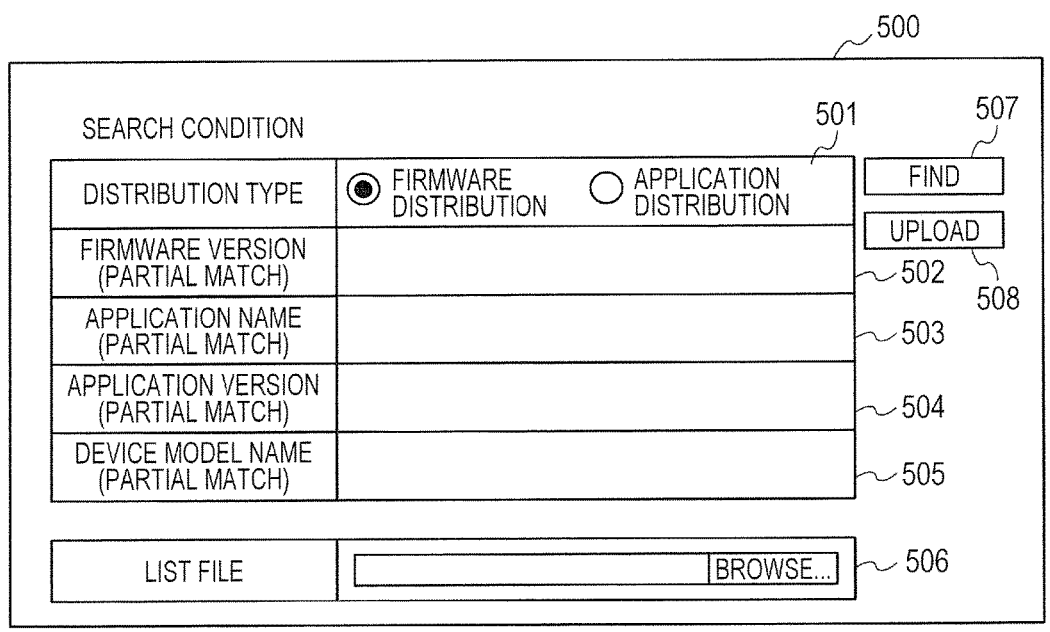
FIG. 7 illustrates a screen example of searching for a target device in application distribution setting in Embodiment 1.

Next, the setting method in the application distribution setting indicated by the process 441 is described. FIG. 7 illustrates an example of a user interface screen initially displayed to allow the service person 402 to perform distribution setting for updating any of the application and FW using the web browser 302.

On the screen 500 in FIG. 7, first, the distribution software type to be updated is selected and the distribution target device is retrieved. A radio button 501 is a button for selecting the distribution software type. In the case of distribution setting of the FW update, "Firmware distribution" is selected. In the case of distribution setting of the application update, "Application distribution" is selected. In a field 502, a search condition for selecting a device having a predetermined FW version is input. In a field 503, a search condition for selecting a device where a predetermined application is installed is input. In a field 504, a search condition for selecting a device where a predetermined version of application is installed is input. In a field 505, a device model name is input as a search condition to select a specific type of device. In a field 506, a file is input where the device ID of the target device is described in the case where the list of target devices is known in advance. Each device is assigned a serial number which serves as an ID for identifying an individual entity. This ID is called a device ID. The device ID is managed by a manufacturer and a vendor. The individual entities of devices as products are managed, while device IDs in a certain range are managed as product of the same model. After the file is input into a field 506, pressing an upload button 508 allows a target device list to be displayed as a target. "Firmware distribution" is selected through the radio button 501, the search conditions are input into the fields 502 and 505, and a search button 507 is pressed, which causes the screen to transition to a screen (not illustrated) for displaying a list satisfying the search condition from a group of devices managed by the distribution system 10. Instead of the search condition, the file where the device ID of the target device is described is input into the field 506, the upload button 508 is then pressed, thereby allowing the screen to transition to a screen (not illustrated) for displaying the target device list as a target.

"Application distribution" is selected through the radio button 501, the search conditions are input into the fields 503 to 505, and the search button 507 is pressed, which causes the screen to transition to the next screen (520 in FIG. 8) for displaying the list satisfying the search condition from the group of devices managed by the distribution system 10.

Instead of the search condition, the file where the device ID of the target device is described is input into the field 506, the upload button 508 is then pressed, thereby allowing the screen to transition to the next screen (520 in FIG. 8) for displaying the target device list as a target.

FIG. 8 illustrates an example of a user interface screen displayed for allowing a distribution target device to be selective with respect to "Application distribution". The screen of the screen 520 is displayed after transition from the screen 500 in FIG. 7. Furthermore, the search condition may be changed in the screen 520 to newly display a device list. It is assumed that the user interfaces of items 521 to 528 have the same functions as the items 501 to 508 in FIG. 7 do. In the example in FIG. 8, as indicated in the radio button 521, the screen is illustrated as a setting screen for "Application distribution".

On a lower part of the screen 520 in FIG. 8, the devices displayed in a list are displayed through search or list file upload. A field 530 indicates checkboxes for allowing distribution target devices to be selected. A field 531 indicates the customers of the target devices from a viewpoint of the service person 402, that is, the customer name of the user. A field 532 indicates the device IDs for identifying the individual devices. A field 533 indicates the model names of the devices. A field 534 indicates the versions of FW operating on the device. A field 535 indicates the application names of the applications (multiple applications for each cell in some cases) installed in the device. A field 536 indicates the application IDs for identifying the individual applications, for the respective applications. A field 537 indicates the versions of the applications, for the respective applications.

A field 538 indicates the execution state of the application in the device, for each application. The execution state is any of "Active", "Stop" and "Unidentified". When there is information transmitted in any of the notifications in the processes 416, 422 and 432 in FIG. 4 and the process 461 in FIG. 5, any of "Active" or "Stop" is displayed. In any of the case with a malfunction in communication, the case of setting that does not issue the notification of the activation state information on the device side, and the case of the device without any notification function, "Unidentified" may be displayed. A field 539 indicates the number of residual licenses (e.g., the number of residual days) usable for each application. In the case where the residual number is limited, notification of information on the residual number from the device allows a numerical value indicating the residual number to be displayed in this field. In the case where the residual number is not limited and the case with no notification of information, "N/A" is displayed. When there is a device list the entire of which cannot be displayed together on the screen, the list can be referred to using a scroll bar 540.

In FIG. 8, unlike the target device list displayed by search in the case where "Firmware distribution" is selected as the distribution type through the radio button 501, pieces of information specific to the application distribution represented in the fields 535 to 539 are also displayed.

The service person 402 who refers to the screen 520 in FIG. 8 changes the search condition here, and displays the device list again, and finally determines the device as the distribution target through the checkbox in the field 530. Pressing a "Next" button for determining the device list causes the screen to transition to the next screen (560 in FIG. 9) where distribution setting is to be performed.

Figure 9:
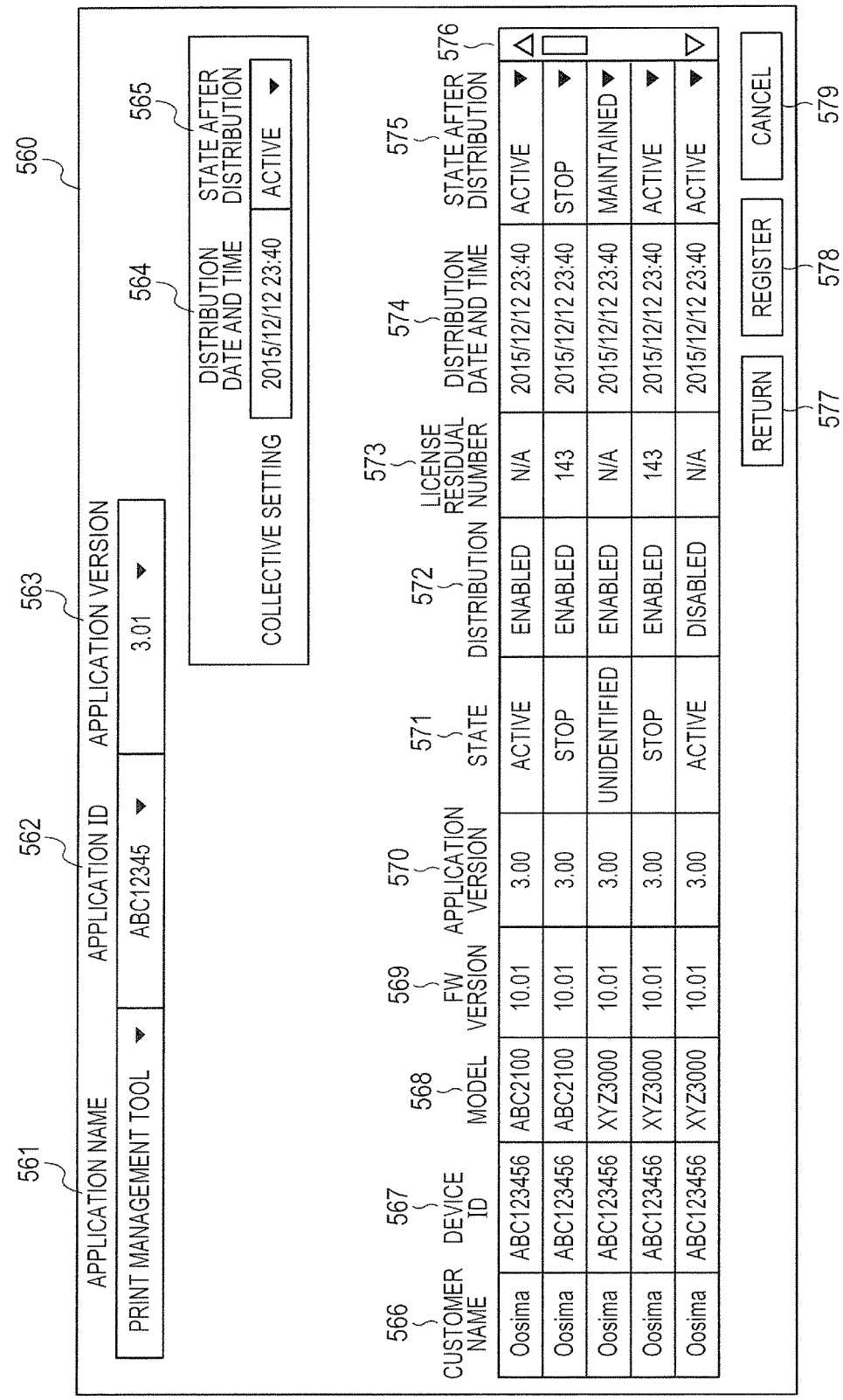
FIG. 9 illustrates a distribution setting screen example in application distribution setting in Embodiment 1.

FIG. 9 illustrates an example of a user interface screen displayed for setting of an application to be updated and of distribution setting into the target device. A screen 560 is a user interface screen for distribution setting to update the application. A field 561 is for designation of the application to be updated through the application name. Through designation of the application, only devices where the application selected in the field 561 is installed in the current state in the device list displayed in the lower part of the screen are narrowed down as distribution targets, and the display is updated. A field 562 is for designation of the application to be updated through the application ID. The result selected through the field 562 is reflected also in the field 561, and the corresponding application name is displayed. It is assumed that the field 562 is also updated at the same time with the ID corresponding to the application name selected in the field 561 in a converse manner. As with the case of the field 561, the device list displayed on the lower part is also updated in the devices where the application is installed. A field 563 is for designation of the version of the application to be updated.

The distribution system 10 holds a list of applications installed in the devices, and the versions of applications that can be distributed. Consequently, according to a publicly known technique, the fields 561, 562 and 563 may be configured to be a drop-down menu that displays only valid applications and versions.

In a lower part of the screen 560 in FIG. 9, a list of devices narrowed down as distribution targets are displayed. Through this user interface, the distribution date and time represented in the field 574 and the state after distribution represented in the field 575 can be set for each device. Furthermore, collective setting of the distribution date and time represented in the field 564 and collective setting of the state after distribution represented in the field 565 allow all the devices displayed in the list to be collectively set to the same setting.

A field 566 indicates the customer names of the devices narrowed down as distribution targets. A field 567 indicates the device IDs of the devices narrowed down as distribution targets. A field 568 indicates the model names of the devices narrowed down as distribution targets. A field 569 indicates the versions of FW operating in the devices narrowed down as distribution targets. A field 570 indicates the versions of the applications that are installed in the devices and designated in the fields 561 and 562. A field 571 indicates the execution states of the application in the devices and designated in the fields 561 and 562. A field 572 indicates whether the version of the application that is installed in the device and designated in the fields 561 and 562 can be updated to the version designated in the field 563 or not. When the field 572 indicates "Enabled", application update can be distributed. When this field indicates "Disabled", the distribution setting of application update for the device is not made. A field 573 indicates license residual number information of the application in the devices and designated in the fields 561 and 562.

Referring to the information in the fields 566 to 573, the service person 402 sets the distribution date and time in the field 574 and the states after distribution in the field 575. The distribution date and time set in the field 574 is returned to each device in the process 446 in FIG. 5, and serves as the timing of the reservation date and time (452). Through the fields 575 and 565, each state can be selected from among four states including "Active", "Stop", "Maintained" and "Automated". When "Active" is selected, "Active" is designated as the activation state after update returned in the process 446 in FIG. 5. Likewise, the "Stop" and "Maintained" are also designated as the activation state after update. In the case of "Automated", a result automatically determined by the distribution system 10 is designated. When there is a device list the entire of which cannot be displayed together on the screen, the list can be referred to using a scroll bar 576.

The service person 402 designates the application to be updated and the version after update in the fields 561 to 563, inputs the distribution setting of the devices in the fields 564, 565, 574 and 575, and subsequently presses a "Register" button 578. The distribution setting for each device is thus completed (process 441 in FIG. 5). Pressing a "Return" button 577 returns the screen to the screen 520 in FIG. 8. Pressing a "Cancel" button 579 terminates the distribution setting.

In this embodiment, even when the "Firmware distribution" is selected through the radio button 501 in FIG. 7, the FW version selection and distribution date and time designation for each target device can be made through a screen not illustrated, as with the case of the application distribution setting screens illustrated in FIGS. 8 and 9. When "Firmware distribution" is selected, information corresponding to the items 530 to 541 in FIG. 8 is not illustrated and the screen corresponding to the user interface screen in FIG. 9 is not illustrated.

Hereinafter, with reference to tables, examples of management information on the applications, FW and devices, and application distribution information are described. First, Table A illustrates an example of the management information on applications stored in the registered application management table 331.

TABLE A

|   | Registration ID | Application ID | Application Name | Version | URL |
|---|---|---|---|---|---|
| 1 | 1211 | PQR12345 | Print Management Tool | 1.00 | http://contents-server. . . . |
| 2 | 1300 | PQR12345 | Print Management Tool | 2.00 | http://contents-server. . . . |
| 3 | 1310 | PQR12345 | Print Management Tool | 3.00 | http://contents-server. . . . |
| 4 | 1330 | PQR12345 | Print Management Tool | 3.01 | http://contents-server. . . . |
| 5 | 1222 | STU12345 | Scan | 2.00 | http://contents-server. . . . |
| 6 | 1212 | LMN12345 | Login | 1.00 | http://contents-server. . . . |

The application management information includes a list of combinations of registration IDs, application IDs, application names, versions and URLs. One application file of a certain version is uniquely identified by a combination of an application ID and a version, and is stored at a storage site in the content server 20 indicated by the URL. The management information on the registered application is assigned a unique registration ID, and can be identified in the management information. On display on the user interface, the application name can be assigned for ease of understanding. The application management information is input when a person in charge registers the application from the vendor system 30, and maintained through update.

When the application installed in the device is subjected to update, such as version upgrade, the distribution system 10 also manages a combination of updatable applications to identify the updatable versions. Table B illustrates an example of the combined management information on updatable applications stored in the updatable application management table 332.

TABLE B

|   | Before Update | After Update |
|---|---|---|
| 1 | 1211 | 1300 |
| 2 | 1300 | 1310 |
| 3 | 1310 | 1330 |
| 4 | 1300 | 1330 |

The management information on updatable applications uses the registration IDs managed by the management information illustrated in Table A, and includes a list of combinations of registration IDs before and after update. Only in the case of presence of a combination of a registration ID before update and a registration ID after update in the management information illustrated in Table B, it is indicated that update between the registration IDs is allowed. The determination result according to the combination is reflected in the field 572 (Distribution) in FIG. 9, for example. The updatable application management information is input when a person in charge registers the application from the vendor system 30, and maintained through update.

In the same manner as that for the application, the distribution system 10 also manages distributable FW. Table C illustrates an example of FW management information registered in the registered firmware management table 333.

TABLE C

|   | Device Model | Version | URL |
|---|---|---|---|
| 1 | ABC2100 | 10.01 | http://contents-server. . . . |
| 2 | ABC2100 | 11.00 | http://contents-server. . . . |
| 3 | ABC2100 | 11.10 | http://contents-server. . . . |
| 4 | XYZ3000 | 01.00 | http://contents-server. . . . |
| 5 | XYZ3000 | 02.00 | http://contents-server. . . . |
| 6 | XYZ3000 | 10.01 | http://contents-server. . . . |

The FW management information includes a list of combinations of device models, versions and URLs. The file of FW corresponding to the combination of the device model and version is stored at a storage site in the content server 20 indicated by URL. For FW in the same manner as that for the application, combinations of updatable versions are managed by management information not illustrated. The FW management information is input when a person in charge registers the FW from the vendor system 30, and maintained through update.

The distribution system 10 holds and manages the state of each distribution target device. One of pieces of information representing the state of each device is version information on FW operating on the device. Table D illustrates an example of the device management information stored in the device management table 334.

TABLE D

| | Device ID | Device Model | Version | Customer Name |
|---|---|---|---|---|
| 1 | ABC111111 | ABC2100 | 10.01 | Oosima |
| 2 | DEF222222 | XYZ3000 | 10.01 | Oosima |
| 3 | DEF333333 | XYZ3000 | 10.01 | Oosima |
| 4 | DEF444444 | XYZ3000 | 10.01 | Oosima |
| 5 | DEF444449 | XYZ3000 | 10.01 | Oosima |

TABLE D-continued

| | Device ID | Device Model | Version | Customer Name |
|---|---|---|---|---|
| 6 | DEF555555 | XYZ3000 | 10.01 | Oosima |
| 7 | DEF555559 | XYZ3000 | 10.01 | Oosima |

The device management information includes a list of combinations of device IDs, device models, versions and customer names. The model indicates the model of a device identified by the device ID. The version indicates the version of FW operating on the device. The customer name indicates the customer name that owns the device.

Another piece of information indicating the state of each device is information on the application installed in the device and its state. Table E illustrates an example of information on installed applications in devices stored in the installed application management table 335.

TABLE E

| | Device ID | Application ID | Version | Operation State | License Residual Number | Residual Number Support |
|---|---|---|---|---|---|---|
| 1 | ABC111111 | PQR12345 | 3.00 | Activation | 0 | FALSE |
| 2 | ABC111111 | STU12345 | 3.00 | Stop | 143 | TRUE |
| 3 | DEF222222 | PQR12345 | 3.00 | Unidentified | 0 | FALSE |
| 4 | DEF222222 | STU12345 | 3.00 | Stop | 143 | TRUE |
| 5 | DEF222222 | LMN12345 | 2.00 | Activation | 0 | FALSE |

The information on installed application includes a list of combinations of device IDs, application IDs, versions, operation states, license residual numbers, and residual number support. A combination of the device ID, application ID and version indicates that the application indicated by the combination of the application ID and the version is installed in the device indicated by the device ID. The operation state indicates the operation state of the application. The residual number support is a flag that is TRUE when the information on the license residual number is valid, and is FALSE when the information on the license residual number is invalid. The license residual number indicates the license residual number of the application in the device. When the residual number support is FALSE, the value of the license residual number is not used.

Table F illustrates an example of the distribution information on applications stored in the application distribution management table 336. When the application distribution setting is registered on the screen 560 illustrated in FIG. 9, the application distribution information illustrated in Table F is updated and a record of distribution setting is added. The application distribution information includes a list of combinations of distribution IDs, device IDs, application IDs, versions, distribution date and time, and state instructions. When the distribution setting is added according to a combination of the remaining columns, a unique identifier is generated and set as the distribution ID.

TABLE F

| | Distribution ID | Device ID | Application ID | Version | Distribution Date and Time | State Instruction |
|---|---|---|---|---|---|---|
| 1 | 234 | ABC111111 | PQR12345 | 3.00 | 2015 Dec. 12 23:40 | Activation |
| 2 | 237 | DEF222222 | STU12345 | 3.00 | 2015 Dec. 12 23:40 | Stop |
| 3 | 250 | DEF333333 | PQR12345 | 3.00 | 2015 Dec. 12 23:40 | Maintained |
| 4 | 251 | DEF444444 | STU12345 | 3.00 | 2015 Dec. 12 23:40 | Stop |
| 5 | 252 | DEF444449 | LMN12345 | 2.00 | 2015 Dec. 12 23:40 | Activation |

Figure 10:
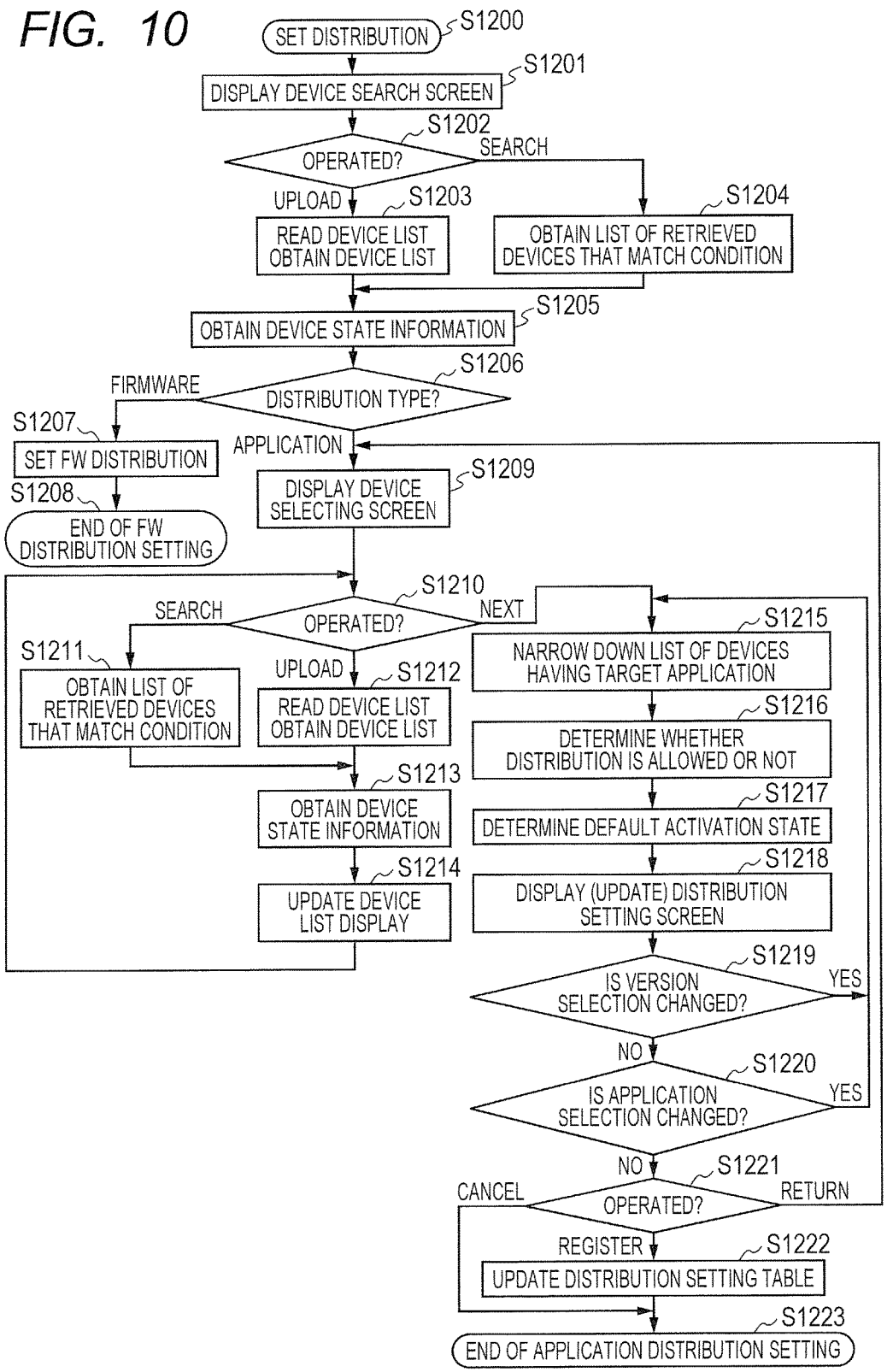
FIG. 10 is a flowchart of distribution setting in the distribution system in Embodiment 1.

FIG. 10 illustrates an example of a flowchart of the distribution setting in the distribution system 10. The process in FIG. 10 corresponds to the processes 441 and 443 in FIG. 4 and is performed in the distribution setting controller 314, and corresponds to screen display represented in FIGS. 7 to 9.

An update reservation operation by the service person 402 in the process 441 or 443 in FIG. 4 starts the distribution setting process (S1200). The distribution setting controller 314 displays the device search screen (FIG. 7) on the user interface 311 in S1201. When the distribution type is set through the radio button 501 and the search condition is input into the fields 502 to 505 and the search button 507 is pressed in FIG. 7, the processing proceeds from S1202 to S1204. When the distribution type is input and the list file is input into the field 506 and the upload button 508 is pressed, the processing proceeds from S1202 to S1203.

The distribution setting controller 314 reads the list of device IDs from the uploaded file in S1203, and revokes the device manager 315 in S1204. In S1204, the device manager 315 searches the device management table 334 and the installed application management table 335 for the list of devices that match the search condition. With respect to the thus obtained device list, the distribution setting controller 314 revokes the device manager 315 and obtains device state information (S1205).

Next, the distribution setting controller 314 determines the content of the distribution setting according to the distribution type designated through the radio button 501, and switches the following process (S1206). That is, in the case of FW, the processing proceeds to S1207 and performs distribution setting corresponding to the process 443. In the case of application, the process proceeds to S1209 and performs distribution setting corresponding to the process 441.

In S1207, the FW distribution setter 318 displays an FW distribution setting screen, performs FW distribution setting, and then updates the FW distribution management table 337. The distribution setting process is thus finished (S1208).

In S1209, the distribution setting controller 314 displays the target device selecting screen (FIG. 8) on the user interface 311. Here, in a lower part of the screen 520 in FIG. 8, the device state information obtained in S1205 is displayed. In S1210, the distribution setting controller 314 determines the next screen transition or display update according to the button pressed. When the search button 527 is pressed, the processing proceeds to S1211 and the device manager 315 retrieves the device. When the upload button 528 is pressed, the processing proceeds to S1212, and the list of device IDs is read. In both cases, the device manager 315 obtains the device state information (S1213), and the distribution setting controller 314 updates the device state information (S1214). Update of the screen 520 in FIG. 8 is repeated until the target device list is determined.

When the "Next" button 541 is pressed in S1210, the processing proceeds to S1215. In S1215, the application distribution setter 317 narrows down the selected target devices to obtain only information on the selected application. This process is a process in the application distribution setter 317, while the items narrowed down correspond to the content of the list display in FIG. 9. In S1216, the application distribution setter 317 searches the updatable application management table 332 and determines whether the application in each device can be updated or not from the version information on the application to be updated and the narrowed-down device state information. This process corresponds to the content displayed in the field 572 in FIG. 9.

In S1217, the default activation state determiner 319 determines the activation state after update, for the application in each of the devices narrowed down. This process corresponds to the content set in the case where "Automated" is selected in the initial display of the field 575 and in the field 565 in FIG. 9. In S1218, the distribution setting controller 314 displays the application distribution setting screen (FIG. 9) on the user interface 311. Here, the initial values listed in FIG. 9 are displayed according to the details determined in S1215 to S1217.

Next, according to an input operation on the screen illustrated in FIG. 9, it is determined whether the version selection and application selection have been changed or not (S1219 and S1220). In the case where the version selection has been changed in the field 563, the processing returns from S1219 to S1215, and the narrowed-down display of the device state information and setting display of the availability of distribution (field 572) and the activation state after update (field 575) are updated. When the application selection has been changed in any of the fields 561 and 562, the processing returns from S1220 to S1215, and the setting display is updated in an analogous manner.

Furthermore, it is determined whether any one of the operation buttons is pressed in the input screen in FIG. 9 (S1221). When all of the distribution date and time and the activation state after update for each device are set and the "Register" button 578 is pressed, the processing proceeds from S1221 to S1222. When it is determined that the "Return" button 577 is pressed in S1221, the processing returns to S1209, that is, the process for the screen in FIG. 8. When it is determined that the "Cancel" button 579 is pressed in S1221, the processing proceeds to S1223 and is finished. In S1222, the application distribution setter 317 reflects the content manually input through the screen in FIG. 9 in the application distribution management table 336. Subsequently, the processing proceeds to S1223 and is finished.

Next, the determination method in the process in S1217 in the default activation state determiner 319 is described. Table G illustrates an example of activation state designation value information after application update stored in the updated state table 338.

TABLE G

| | Registration ID Before Update | Registration ID After Update | Activation State After Update |
|---|---|---|---|
| 1 | 1211 | 1300 | Activation |
| 2 | 1300 | 1310 | Maintained |
| 3 | * | 1222 | Activation |
| 4 | 1212 | * | Stop |

The activation state designation value information includes a list of combinations of registration IDs before update, registration IDs after update, and activation states after update. The registration ID before update is the registration ID of the application installed in the device. The registration ID after update is the registration ID of the application after update that is to be subjected to distribution setting. Here, the registration ID managed by the registered application management table 331 is referred to. That is, as to the device subjected to application distribution setting that matches the combination of the registration ID before update and the registration ID after update, the value defined in the activation state after update is used as the initial value of the state after distribution (field 575) in the distribution setting screen display. In the case of absence of the matched combination, "Maintained" is adopted as the initial value.

When any of the registration ID before update and the registration ID after update is "+", it is determined that any registration ID matches the case. For instance, in the example on the third row in Table G, "Activation" is designated as the initial value for the device to which application distribution setting is made from the application with any registration ID to that with the registration ID of 1222. The example on the fourth row means that when application distribution setting is made from the application with the registration ID of 1212, "Stop" is designated as the initial value. According to the example of the description method in Table G, a combination of any registration ID can be described. In actuality, only the application with the same application ID can be updated. Consequently, setting between different applications is not referred to. Furthermore, the updatable combination is determined by the updatable application management table 332. Consequently, a combination that cannot be updated is invalid setting. The activation state designation value information is input when a person in charge registers the application from the vendor system 30, and maintained through update.

Figure 11:
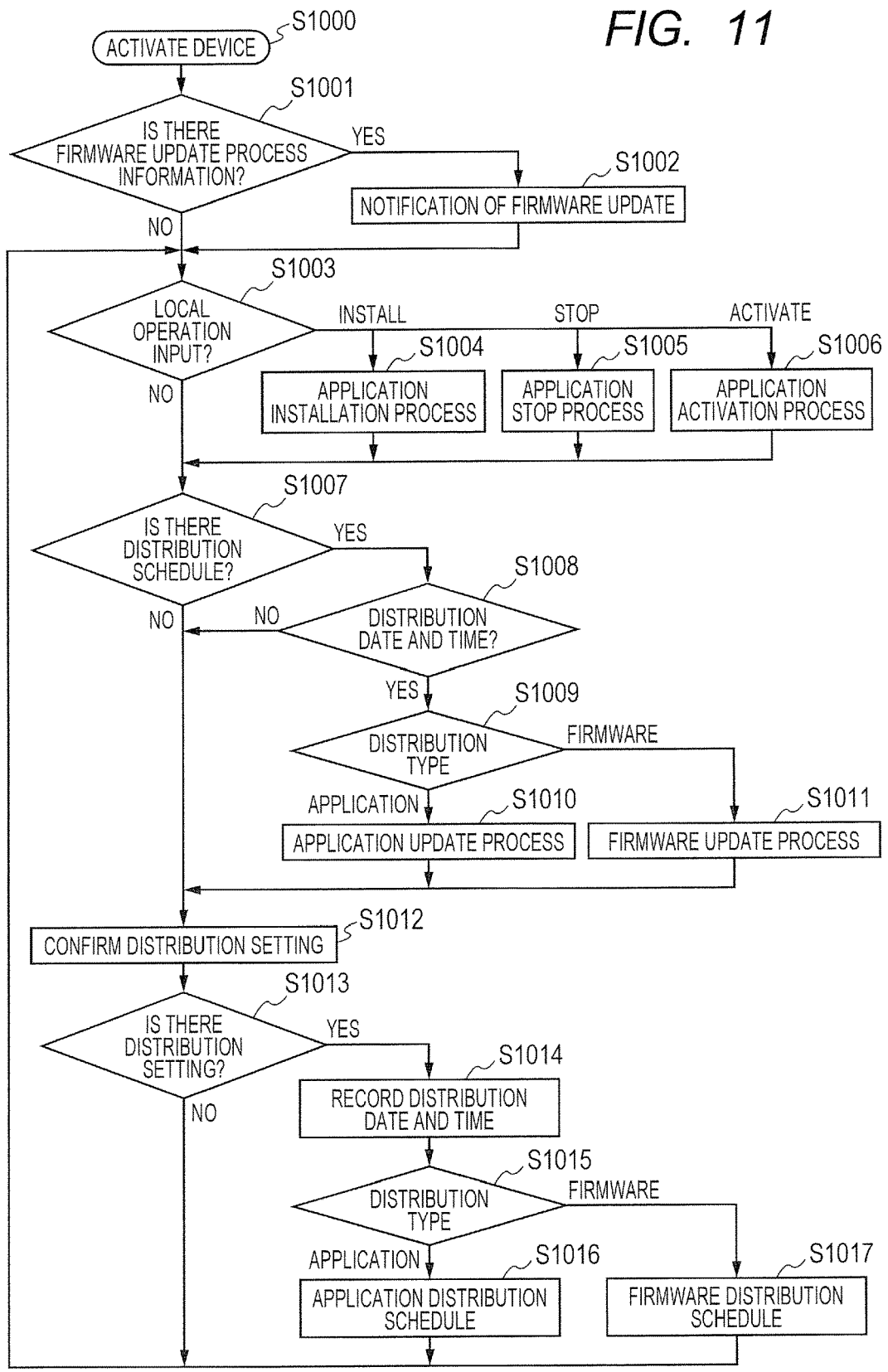
FIG. 11 is a flowchart of a distribution processor in the device in Embodiment 1.

Next, the distribution process on the device side is described. FIG. 11 is an example of a flowchart of a distribution process in the device 400. FIG. 11 illustrates all the processes from activation of the device to reception of application and FW distribution. The processes are executed in the distribution processor 342.

First, the power of the device 400 is turned on in S1000, the distribution processor 342 determines whether or not an FW update process is performed before the power is turned on (S1001). This determination is performed with reference to information recorded in S1104 in FIG. 15, described later. When the FW is updated, FW update notification is transmitted to the distribution system 10 in S1002. This notification corresponds to the process 472 in FIG. 6. The information transmitted here is information for updating the device management table corresponding to Table D. That is, the information includes the device ID and device model of the device 400 and the version after update.

Next, in S1003, an input operation at the device 400 is confirmed. In the case of presence of the input operation, the corresponding process according to the operation is performed. When the input operation for application installation (process 410 in FIG. 4) is performed ("INSTALL"), the application installer 343 is revoked in S1004 and the process illustrated in FIG. 12 described later is performed. When the application stop operation (process 421 in FIG. 4) is performed ("STOP"), the application activation controller 346 is revoked in S1005 and the process illustrated in FIG. 13 described later is performed. When the application activation operation (process 431 in FIG. 4) is performed ("ACTIVATE"), the application activation controller 346 is revoked in S1006 and the process illustrated in FIG. 14 described later is performed.

In S1007, it is determined whether there is a distribution schedule in the device 400 or not. This process is for confirming the schedule set in any of S1016 and S1017 described later. In the case of presence of the schedule, the processing proceeds to S1008. In S1008, it is determined whether the scheduled distribution date and time is reached at the time or not. In the case where the distribution date and time is reached, the processing proceeds to S1009. In the case where the distribution date and time is not reached, the processing proceeds to S1012. In S1009, it is verified whether the scheduled distribution type is an application or FW. In the case of an application, the processing proceeds to S1010. In the case of FW, the processing proceeds to S1011. The case of an application corresponds to the sequence from the timing of the process 452 in FIG. 5. The case of FW corresponds to the sequence from the timing of the process 472 in FIG. 6.

In S1010, the application updater 344 is revoked, and a process illustrated in FIG. 16 described later is performed. In S1011, the FW updater 345 is revoked, and a process illustrated in FIG. 15 described later is performed. After the FW update process is revoked in S1011, the processing proceeds to the next process in a manner analogous to that for the application.

Next, in S1012, the distribution setting is confirmed. This confirmation corresponds to the processes 445 and 446 of the sequences in FIGS. 4, 5 and 6. The distribution processor 342 transmits the own device ID to the distribution system 10 according to the process 445. In the case of presence of distribution setting for the device 400, the distribution processor 342 receives the distribution setting information from the distribution system 10. The distribution setting information received in the process 446 is information corresponding to the device ID of the device 400 in Table F in the case of application distribution. The distribution processor 342 receives, from the distribution system 10, not only information on presence of application distribution setting but also the distribution ID, the application ID, the version, the distribution date and time, and the state instruction after update.

In S1013, presence or absence of distribution setting is determined according to the response from the distribution system 10. In the case of presence of distribution setting, the processing proceeds to S1014. In the case of absence of distribution setting, the processing returns to S1003 and the distribution process is repeated. In S1014, the distribution date and time received from the distribution system 10 is stored. The distribution date and time stored here is referred to by the determination of presence or absence of the distribution schedule in S1007 and S1008.

In S1015, the received distribution type is determined. When the distribution setting received from the distribution system 10 is the application distribution setting, the processing proceeds to S1016, the distribution setting of the application distribution is stored, and the application distribution is scheduled. When the received distribution setting is the FW distribution setting, the processing proceeds to S1017, the distribution setting of FW distribution is stored, and the FW distribution is scheduled. In each of the cases, after the distribution setting is stored, the processing returns to S1003 and the distribution process is repeated. Table H illustrates an example of the distribution setting information on application distribution stored in the device 400. The application distribution setting information is stored as the combination of the distribution ID, application ID, version, distribution date and time, and state instruction.

TABLE H

| | Distribution ID | Application ID | Version | Distribution Date and Time | State Instruction |
|---|---|---|---|---|---|
| 1 | 234 | PQR12345 | 3.00 | 2015 Dec. 12 23:40 | Activation |

Figure 12:
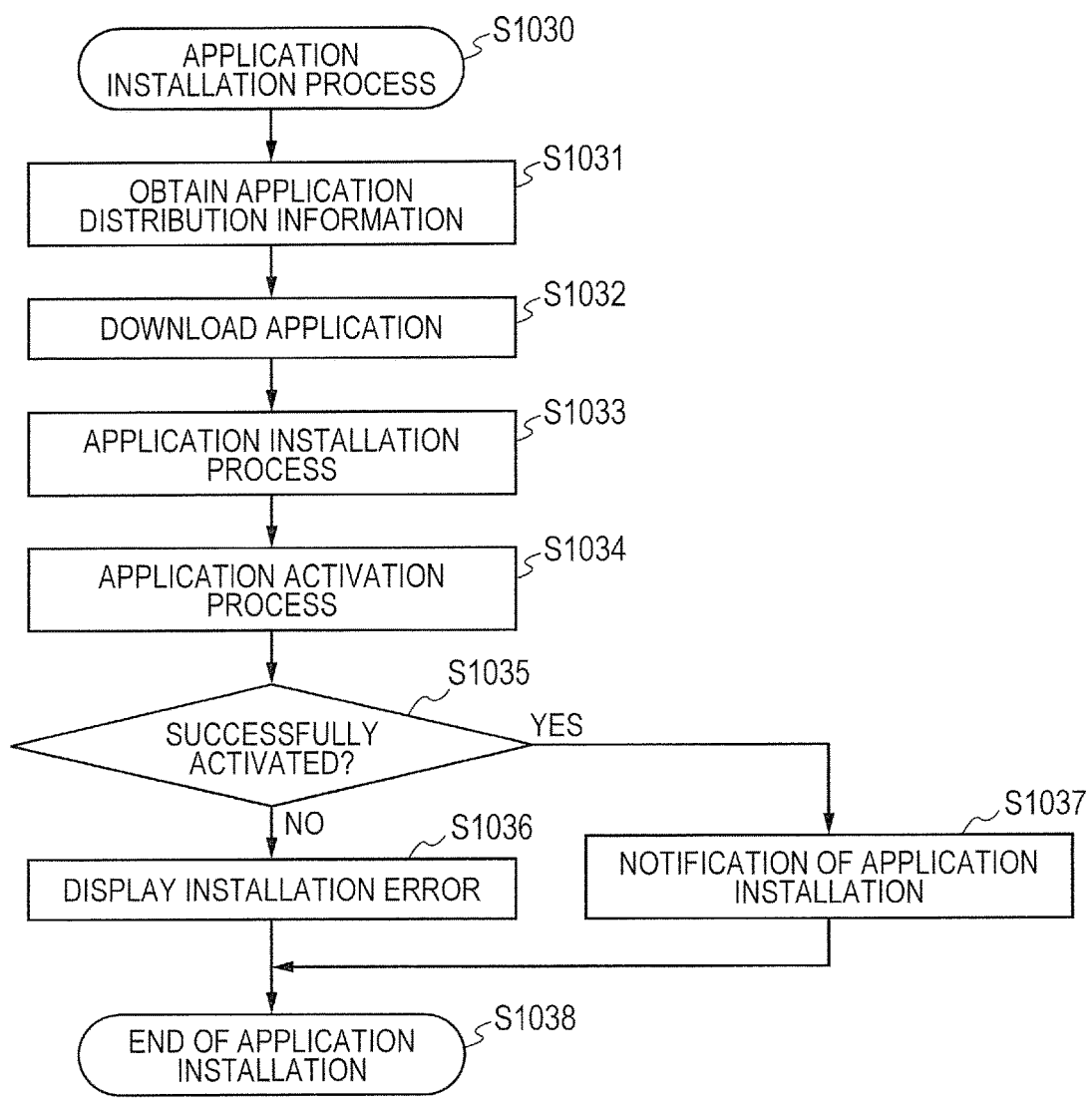
FIG. 12 is a flowchart of an application installer in the device in Embodiment 1.

FIG. 12 illustrates an example of a flowchart of the installation process of the application corresponding to S1004 in FIG. 11. This process is executed by the application installer 343. Upon being revoked by the distribution processor 342, the application installer 343 starts the processes from S1030.

In S1031, any of the name and application ID of the application to be installed is transmitted to the distribution system 10, and the URL for downloading the file of the application is obtained. This process corresponds to the processes 411 and 412 in FIG. 4. In S1032, the file of the application at the obtained URL is downloaded. This process corresponds to the processes 413 and 414 in FIG. 4. The application obtained in S1033 is installed. The application is activated in S1034. These processes correspond to the process 415 in FIG. 4.

In S1035, it is determined whether the application has been successfully activated and is normally operating or not. In the case with normal operation, the processing proceeds to S1037. In the case without normal operation, the processing proceeds to S1036. In S1037, application installation notification corresponding to the processes 416 and 418 in FIG. 4 is transmitted to the distribution system 10. Here, the information transmitted by the application installer 343 to the distribution system corresponds to the information in Table E. That is, in the case of presence of the device ID of the device 400, the application ID and the version of the installed application and where the operation state is currently "Activation" and of presence of the information on the license, the residual number support flag of TRUE and the license residual number are transmitted. When the response (process 418) from the distribution system 10 is returned, the processing is finished in S1038 and returns to the process in FIG. 11. In S1036, an error display of installation is output. In S1038, the processing is finished and returns to the process in FIG. 11.

Figure 13:
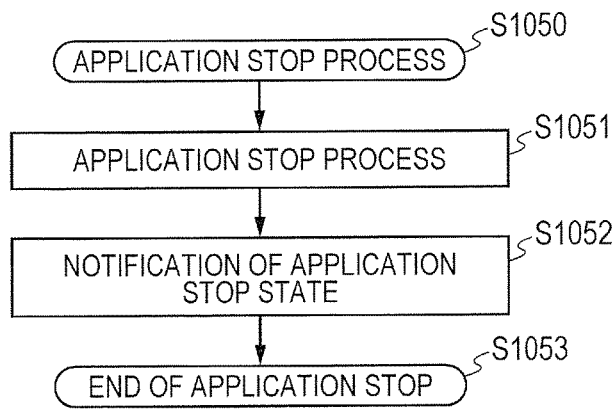
FIG. 13 is a flowchart of a stop process of an application activation controller in the device in Embodiment 1.

FIG. 13 illustrates an example of a flowchart of the stop process of the application corresponding to S1005 in FIG. 11. This process is executed by the application activation controller 346. Upon being revoked by the distribution processor 342, the application activation controller 346 starts the processes from S1050.

First, in S1051, the designated application is stopped. The process corresponds to the process 422 in FIG. 4. In S1052, the distribution system 10 is notified the fact that the designated application is stopped, which corresponds to the processes 423 and 425 in FIG. 4. Here, the information transmitted by the application activation controller 346 to the distribution system 10 corresponds to the information on Table E as with the information transmitted in S1037 in FIG. 12. Note that notification on the fact that the operation state is currently "Stop" is transmitted. When the response (process 425) from the distribution system 10 is returned, the processing is finished in S1053 and returns to the process in FIG. 11.

Figure 14:
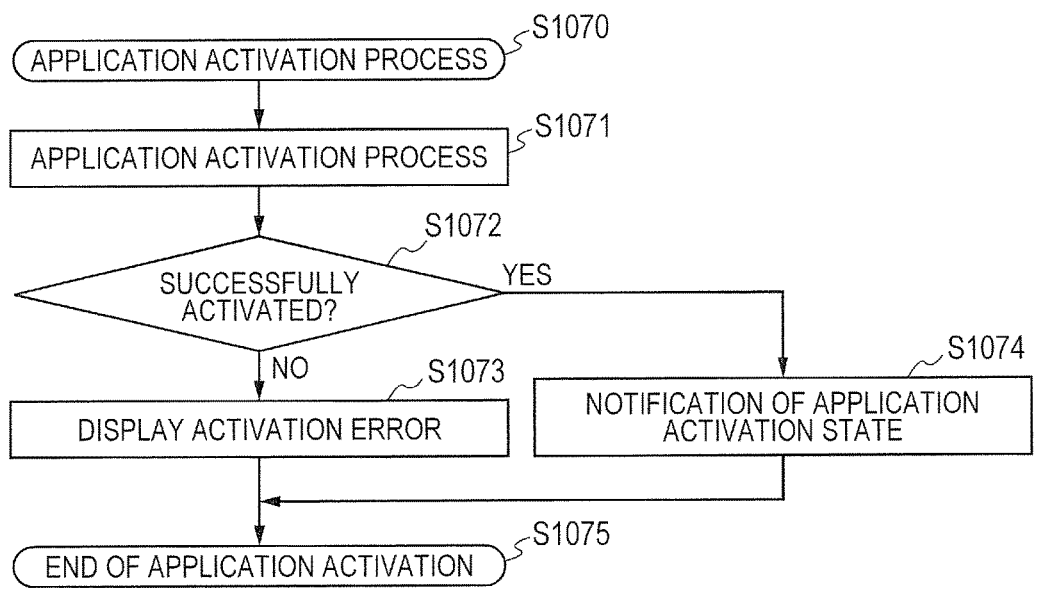
FIG. 14 is a flowchart of an activation process of the application activation controller in the device in Embodiment 1.

FIG. 14 illustrates an example of a flowchart of the activation process of the application corresponding to S1006 in FIG. 11. This process is executed by the application activation controller 346. Upon being revoked by the distribution processor 342, the application activation controller 346 starts the processes from S1070.

In S1071, the designated application is activated. The process corresponds to the process 432 in FIG. 4. In S1072, it is determined whether the application has been successfully activated and is normally operating or not. In the case with normal operation, the processing proceeds to S1074. In the case without normal operation, the processing proceeds to S1073. In S1074, the application activation corresponding to the processes 433 and 435 in FIG. 4 is transmitted to the distribution system 10. Here, the information transmitted by the application activation controller 346 to the distribution system 10 corresponds to the information on Table E as with the information transmitted in S1037 in FIG. 12. When the response (process 435) from the distribution system 10 is returned, the processing is finished in S1075 and returns to the process in FIG. 11. In S1073, an error display of activation is output. In S1075, the processing is finished and returns to the process in FIG. 11.

Figure 15:
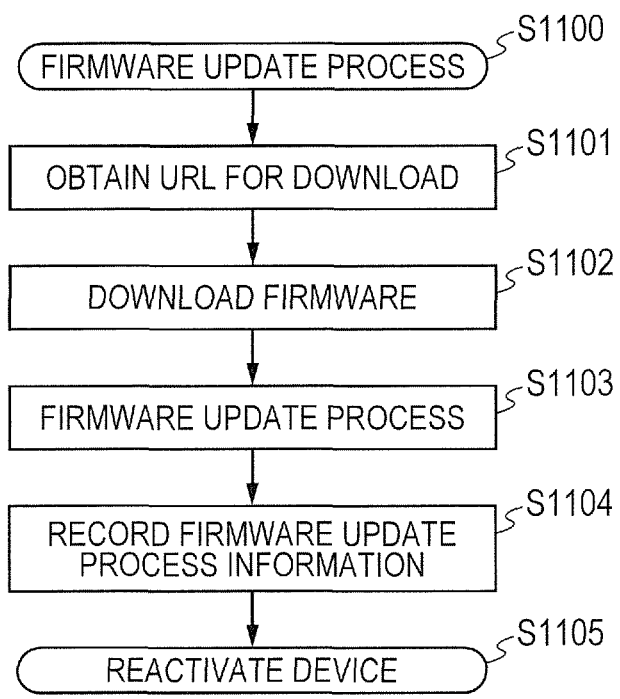
FIG. 15 is a flowchart of an FW updater in the device in Embodiment 1.

FIG. 15 illustrates an example of a flowchart of the FW update process corresponding to S1011 in FIG. 11. This process is executed by the FW updater 345. Upon being revoked by the distribution processor 342, the FW updater 345 starts the processes from S1100.

In S1101, the distribution ID obtained from the distribution setting is transmitted to the distribution system 10, and the URL for downloading the file of FW to be updated is obtained. This process corresponds to the processes 473 and 474 in FIG. 6. In S1102, the file of FW at the obtained URL is downloaded. This process corresponds to the processes 475 and 476 in FIG. 6. In S1103, the FW to be updated is installed so that the downloaded FW can operate after reactivation. The update process information to be checked in S1001 in FIG. 11 at reactivation is stored (S1104). The process corresponds to the process 477 in FIG. 6. The device 400 is reactivated and the processing is finished (S1105).

Figure 16:
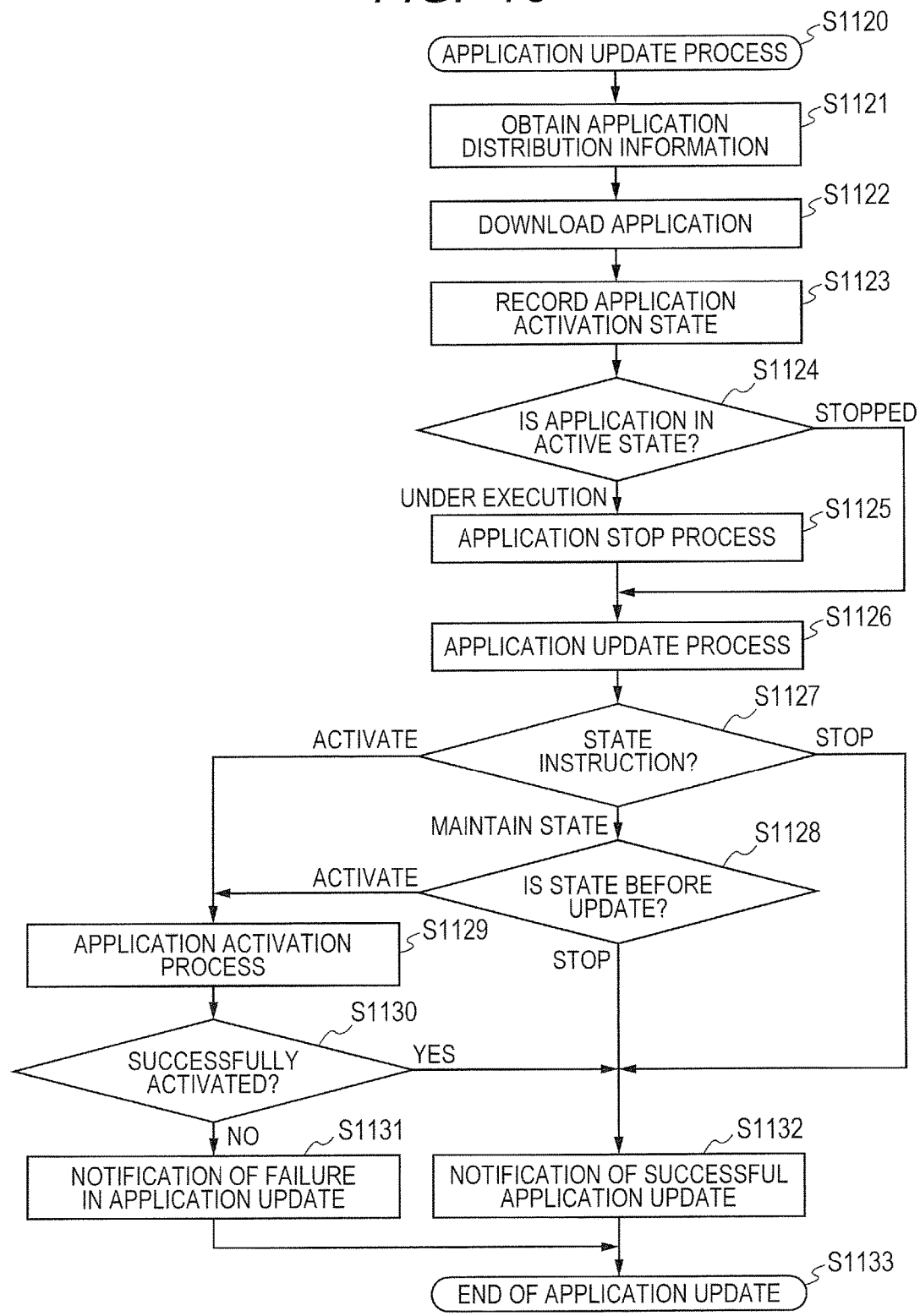
FIG. 16 is a flowchart of an application updater in the device in Embodiment 1.

FIG. 16 illustrates an example of a flowchart of the application update process corresponding to S1010 in FIG. 11. This process is executed by the application updater 344. Upon being revoked by the distribution processor 342, the application updater 344 starts the processes from S1120.

In S1121, the distribution ID obtained from the distribution setting is transmitted to the distribution system 10, and the URL for downloading the file of application to be updated is obtained. This process corresponds to the processes 453 and 454 in FIG. 5. In S1122, the file of the application is downloaded from the obtained URL. This process corresponds to the processes 455 and 456 in FIG. 5. Next, in S1123, the activation state of the current target application is stored. In S1124, the application activation state is determined. In the active case ("UNDER EXECUTION"), the processing proceeds to S1125 and the application stop process is performed. The process corresponds to the process 458 in FIG. 5. Subsequently, the processing proceeds to S1126 and the application update process is performed. The process corresponds to the process 459 in FIG. 5. When the application activation state is stop in S1124 ("STOPPED"), the processing proceeds to S1126 without the stop process.

Subsequently, the processing is branched according to the activation state instruction after application update included in the distribution setting (Table H) received in the process 446 and stored in S1016 (S1127). When the activation state instruction is the stop instruction ("STOP"), the processing proceeds to S1132 because the state is allowed to be left in the stop state. In the case of activation instruction ("ACTIVATE"), the processing proceeds to S1129. In the case of the instruction of maintaining the state before update ("MAINTAIN STATE"), the processing proceeds to S1128 and the state before activation stored in S1123 is confirmed. In the case where the state before update is "ACTIVATE" in S1128, the processing proceeds to S1129. In the case where this state is "STOP", the processing proceeds to S1132.

In S1129, the installed application is activated. The process corresponds to the process 461 in FIG. 5. In S1030, it is determined whether the application has been successfully activated and is normally operating or not. In the case with normal operation, the processing proceeds to S1132. In the case without normal operation, the processing proceeds to S1131. In S1131, failure in application update is transmitted to the distribution system 10. In S1132, success in application update, that is, the same information as the application installation notification, is transmitted to the distribution system 10. Here, the information transmitted by the application installer 434 to the distribution system 10 corresponds to the information on Table E as with the information transmitted in S1037 in FIG. 12. Note that the operating state which is any of "ACTIVATE" and "STOP" is notified according to the current state. The notification to the distribution system 10 in S1131 and S1132 corresponds to the process 462 in FIG. 5. When the response (process 464) from the distribution system 10 is returned, the processing is finished in S1133 and returns to the process in FIG. 11.

Figure 17:
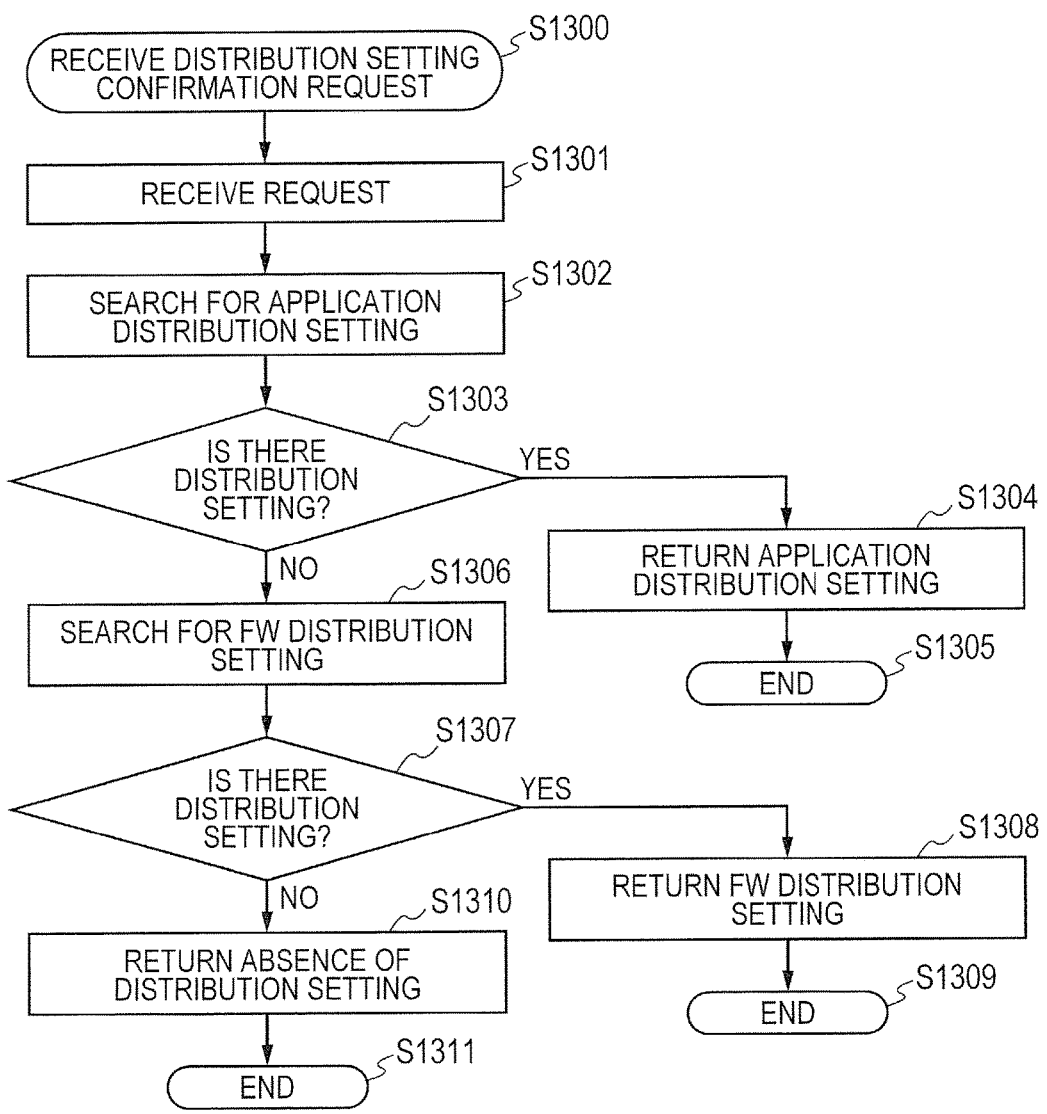
FIG. 17 is a flowchart of a process for a distribution setting confirmation request in the distribution system in Embodiment 1.

FIG. 17 illustrates an example of a flowchart of a process for a distribution setting confirmation request issued by the device 400 in the distribution system 10. This process corresponds to the processes 445 and 446 in FIGS. 4 to 6 and is executed in the web interface 310. Upon receipt of the request for confirmation of presence or absence of the distribution setting issued by each device in the process 446, the processes from S1300 are started.

First, in S1301, the request is received. In S1302, with the device ID passed through the request, the application distribution management table 336 is searched for the application distribution setting. In S1303, the presence or absence of the application distribution setting is determined. In the case of presence of application distribution setting, the processing proceeds to S1304. In the case of absence, the processing proceeds to S1306. In S1304, the distribution setting information on the target device ID is obtained from the application distribution management table 336, and returned as the application distribution setting information. The processing is then finished (S1305).

In S1306, with the device ID passed through the request, the FW distribution management table 337 is searched for the FW distribution setting. In S1307, the presence or absence of the FW distribution setting is determined. In the case of presence of FW distribution setting, the processing proceeds to S1308. In the case of absence, the processing proceeds to S1310. In S1308, the distribution setting information on the target device ID is obtained from the FW distribution management table 337, and returned as the FW distribution setting information. The processing is then finished (S1309). In S1310, the response is returned, assuming absence of distribution setting on the application and FW. The processing is then finished (S1311).

Figure 18:
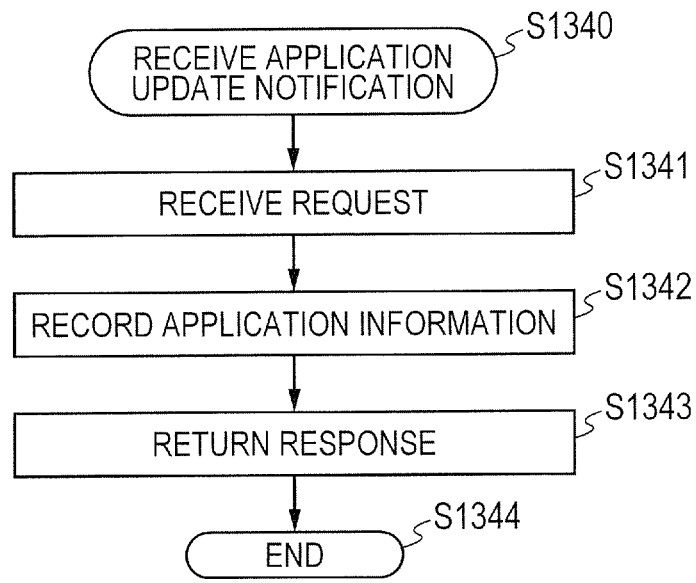
FIG. 18 is a flowchart of a process for an application update notification request in the distribution system in Embodiment 1.

FIG. 18 illustrates an example of a flowchart of a process for an application update notification request issued by the device 400 in the distribution system 10. This process corresponds to the process 416 in FIG. 4 and the process 462 in FIG. 5 and is executed in the web interface 310. Upon receipt of the application update notification request issued by each device in any of the processes 416 and 462, the processes from S1340 are started.

First, in S1341, the request is received. In S1342, the installed application management table 335 is updated with information that corresponds to Table E and passed through the request. Subsequently, in S1343, a response is returned. The processing is then finished (S1344).

Figure 19:
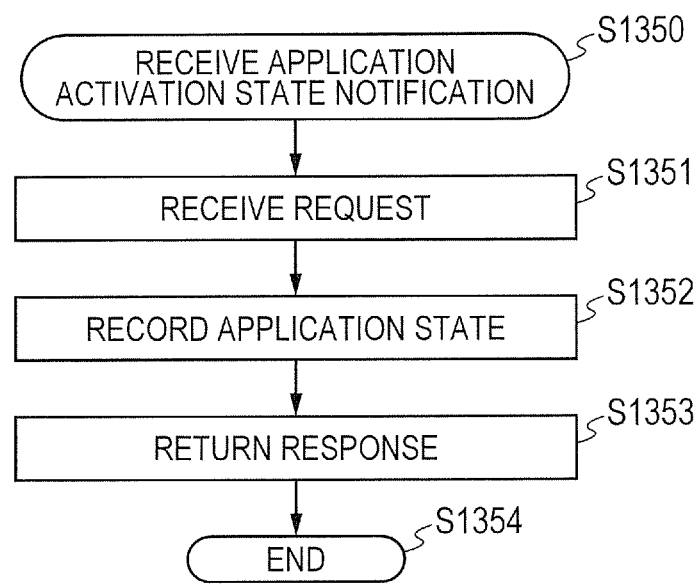
FIG. 19 is a flowchart of a process for an application activation state notification request in the distribution system in Embodiment 1.

FIG. 19 illustrates an example of a flowchart of a process for an application activation state notification request issued by the device 400 in the distribution system 10. This process corresponds to the processes 423 and 433 in FIG. 4 and is executed in the web interface 310. Upon receipt of the application activation state notification issued by each device in any of the processes 423 and 433, the processes from S1350 are started.

First, in S1351, the request is received. In S1352, the installed application management table 335 is updated with information that corresponds to Table E and passed through the request. Subsequently, in S1353, a response is returned. The processing is then finished (S1354).

As described above, the installation state and the activation state of FW and application in each device are maintained; in the case where the distribution setting is made to update the application in the distribution system, the activation state after update can be designated on a device-by-device basis. Consequently, even when the devices have different application activation states, the application can be collectively updated through remote distribution with appropriate activation states. Furthermore, the activation state after update can be collectively, automatically set for each combination of applications before and after update. Consequently, the activation states can easily, collectively set in conformity with the application-specific situations.

Embodiment 2

In Embodiment 1, the list file designated in the input screen including the field 506 (S1203 in FIG. 10) in FIG. 7 or the field 526 (S1212 in the same figure) in FIG. 8 and uploaded is a list of device IDs. In Embodiment 2, a list file is designated here that is a file which is to be uploaded and also includes information on designation of the state after application update. Embodiment 2 has the same basic configuration as Embodiment 1 does. Consequently, only the difference from Embodiment 1 is described.

Table I illustrates an example of a target device list file that also includes the designation of the activation state after application update. It is assumed that the example illustrated in Table I is stored in a file in a form, such as a CSV file (comma-delimited file).

TABLE I

|   | Device ID | Application ID | State Instruction |
|---|---|---|---|
| 1 | XYZ000010 | ZZZ00001 | Activation |
| 2 | XYZ001012 | ZZZ00001 | Activation |

TABLE I-continued

|   | Device ID | Application ID | State Instruction |
|---|---|---|---|
| 3 | XYZ003055 | ZZZ00001 | Stop |
| 4 | XYZ090010 | ZZZ00003 | Maintained |

The target device list file illustrated in Table I includes a list of combinations of device IDs, application IDs, and state instructions. The device ID indicates distribution setting target device. The application ID corresponds to the device ID and indicates the application whose updated state is to be designated. In the case where the list file of the example illustrated in Table I is read in S1203 or S1212 in FIG. 10, the default value of the activation state after update is determined according to the value on the column of the state instruction in Table I in S1217 in FIG. 10. The state instruction in the case of designation of "Automated" in the collective setting is also determined in an analogous manner.

As described above, the activation state after update is designated on a device-by-device basis when the target device list is designated with the file in the distribution system. This designation allows the operation to be performed more flexibly compared to the case of individual setting through the user interface.

Embodiment 3

Figure 20:
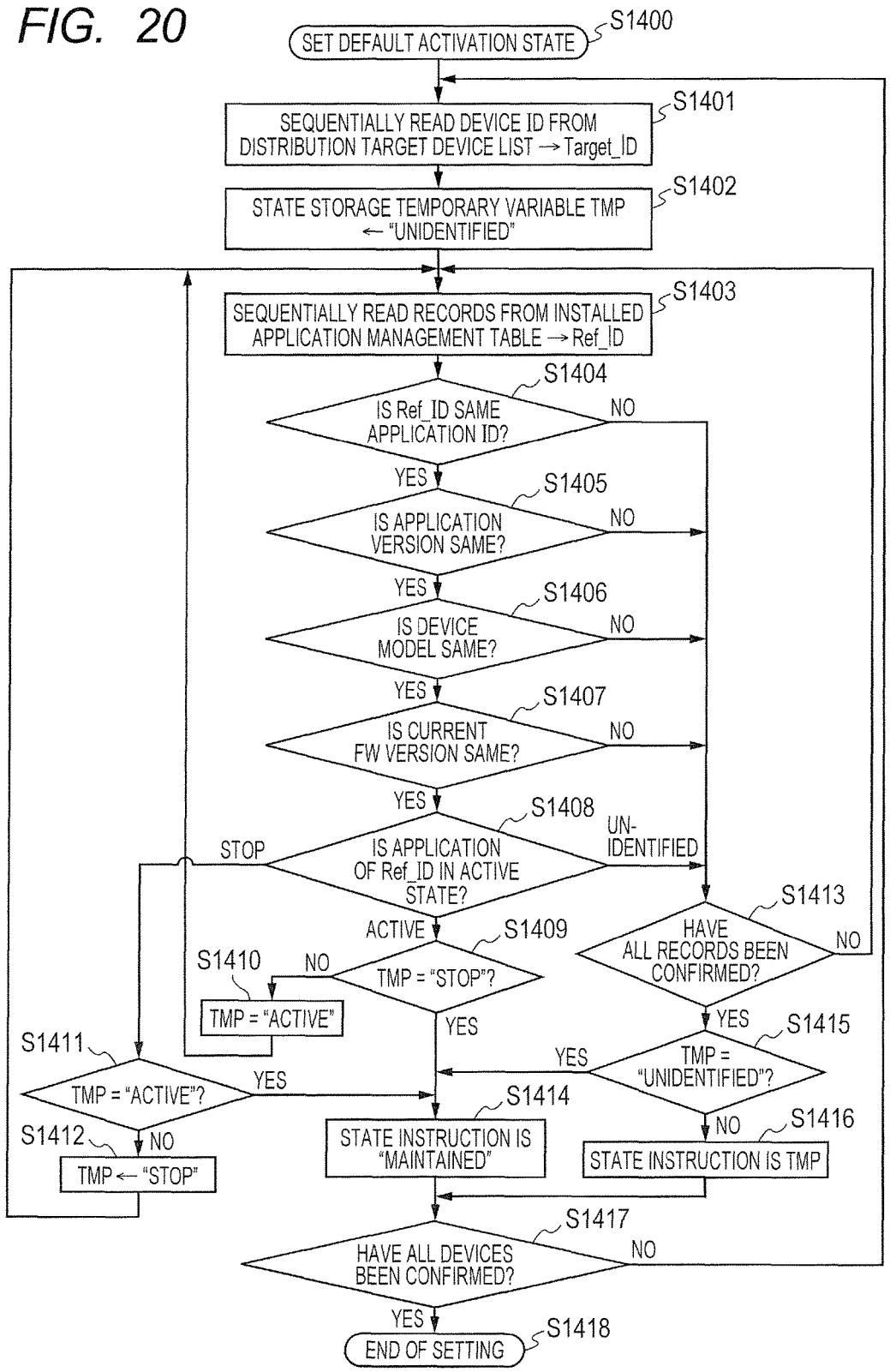
FIG. 20 is a flowchart of a process of a default activation state determiner in a distribution system in Embodiment 3.

Embodiment 3 is hereinafter described. Embodiment 3 has the same basic configuration as Embodiment 1 does. Consequently, only the difference from Embodiment 1 is described. FIG. 20 illustrates an example of a flowchart of a process of the default activation state determiner 319 in Embodiment 3.

In S1400, the process of S1217 in FIG. 10 in Embodiment 1 is started. In S1401, the device IDs in the distribution target device list narrowed down in S1215 in FIG. 10 is held in a temporary variable Target_ID for sequential processes. Hereinafter, the processes from S1402 to S1417 are repeated for each device ID.

In S1402, "Unidentified" is set in the temporary variable TMP for determining the default activation state in the process of the flowchart. In S1403, each record (row) in the table is held in the temporary variable Ref_ID for sequentially processing the pieces of application information on the devices recorded in the installed application management table 335. Hereinafter, the processes from S1404 to S1413 are repeated for each piece of the application information.

In S1404, it is determined whether or not the application ID recorded in the record indicated by the Ref_ID matches the application ID that is currently to be subjected to the distribution setting. In the case of match, the processing proceeds to S1405. In the case of mismatch, the processing proceeds to S1413. In S1405, it is determined whether the application version recorded in the record indicated by the Ref_ID matches the version of the distribution target application installed in the device of the Target_ID or not. In the case of match, the processing proceeds to S1406. In the case of mismatch, the processing proceeds to S1413. In S1406, the device management table 334 is searched for the device models corresponding to the device IDs, and it is determined whether the device model of the device with the device ID recorded in the record indicated by the Ref_ID matches the device model of the Target_ID or not. In the case of match, the processing proceeds to S1407. In the case of mismatch, the processing proceeds to S1413. In S1407, the device management table 334 is searched for the FW versions corresponding to the device IDs, and it is determined whether or not the FW version of the device with the device ID recorded in the record indicated by the Ref_ID matches the FW version of the Target_ID. In the case of match, the processing proceeds to S1408. In the case of mismatch, the processing proceeds to S1413.

Next, in S1408, the activation state of the application recorded in Ref_ID is determined, and the processing is branched according to the result of the determination. In the case where the activation state is "UNIDENTIFIED", the processing proceeds to S1413. In the case of "ACTIVATE", the processing proceeds to S1409. In the case of "STOP", the processing proceeds to S1411. In S1409, it is determined whether the temporary variable TMP is "STOP" or not. The TMP of "STOP" means that the devices with the same condition include those in "ACTIVATE" state and those in "STOP" state in a mixed manner. Consequently, the processing proceeds to S1414, and the state instruction for the Target_ID is determined to be "MAINTAINED". In the case where TMP is not "STOP", the processing proceeds to S1410, the TMP is set to "ACTIVATE", and the processing returns to S1403.

In S1411, it is determined whether the temporary variable TMP is "ACTIVATE" or not. The TMP of "ACTIVATE" means that the devices with the same condition include those in "ACTIVATE" state and those in "STOP" state in a mixed manner. Consequently, the processing proceeds to S1414. In the case where TMP is not "ACTIVATE", the processing proceeds to S1412, the TMP is set to "STOP", and the processing returns to S1403.

In S1413, it is determined whether all the records in the installed application management table 335 have been inspected or not. When records to be inspected remain, the processing returns to S1403 and the process is repeated. When all the records have been inspected, it is determined whether the initial value set in TMP still has the initial value of "UNIDENTIFIED" set in S1402 or not in S1415. The case of TMP of "UNIDENTIFIED" means that there are no other devices having the same condition as that of Target_ID, or all the application activation states of the applications under the same condition among all the devices under the same condition are "UNIDENTIFIED", that is, there is no information. Consequently, the processing proceeds to S1414, and the state instruction for the Target_ID is determined to be "MAINTAINED". The cases other than the case of TMP of "UNIDENTIFIED" ("ACTIVE" or "STOP") mean that all the devices under the same condition except the devices with the activation state of "UNIDENTIFIED" are in the same activation state. Consequently, the processing proceeds to S1416, it is determined that TMP is the activation state after update in conformity with the other devices even when the activation state of the device with Target_ID is "UNIDENTIFIED".

The processing proceeds from S1414 and S1416 to S1417, and it is determined whether all the distribution target devices have been inspected or not. In the case where all the devices have been inspected, the processing proceeds to S1418 and is finished. In the case where devices to be inspected remain, the processing returns to S1401 and the processes are repeated.

As described above, the determination of the default activation state is made from the application states of the other devices under the same condition. Consequently, even in the case with many target devices and the case where the state cannot be determined uniformly based on the application, the updated states can be collectively determined. This determination exerts an advantageous effect that can make determination including devices whose operation states are unidentified.

Embodiment 4

Figure 21:
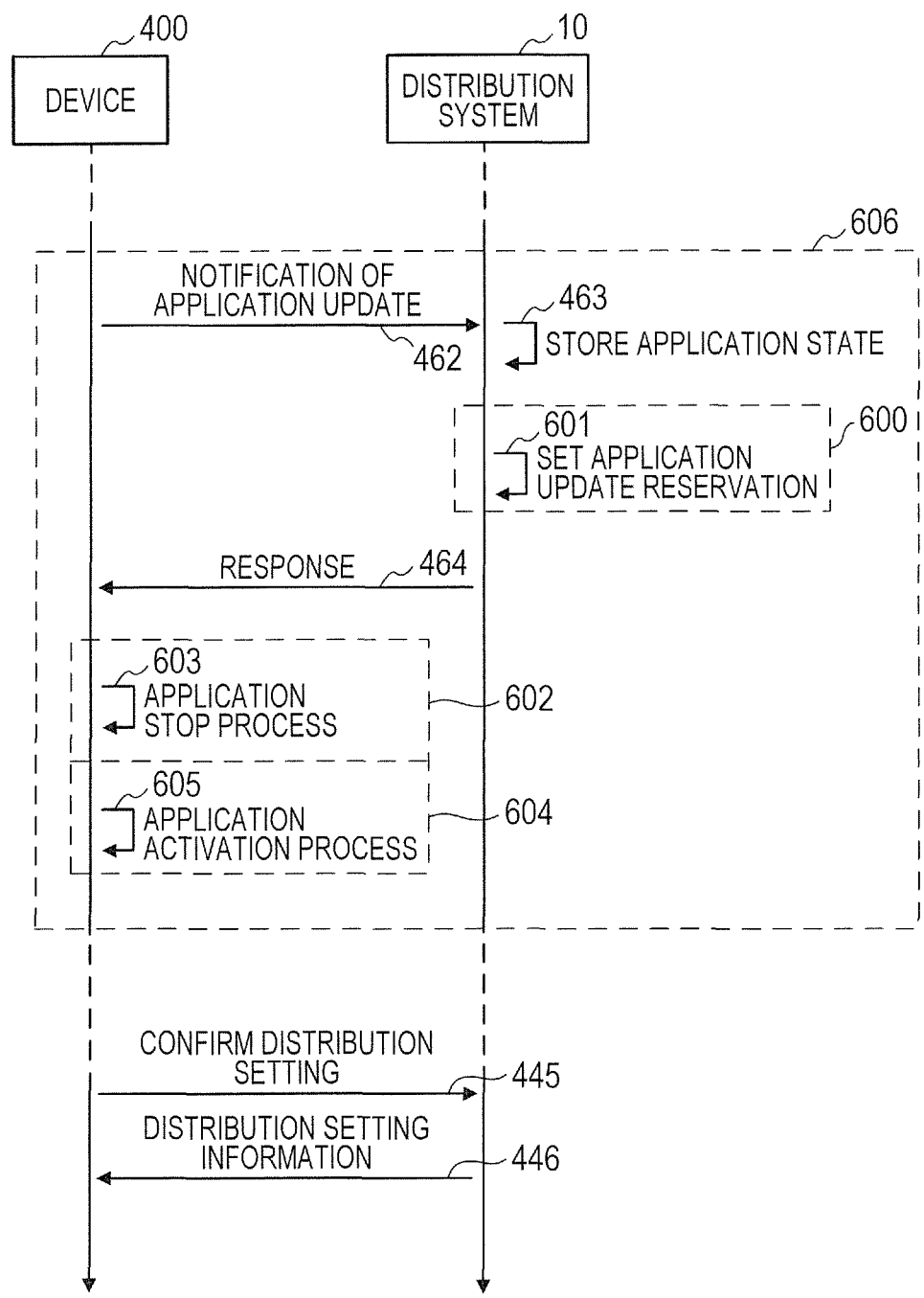
FIG. 21 is a distribution sequence example of application update in Embodiment 4.

Embodiment 4 is hereinafter described. Embodiment 4 has the same basic configuration as Embodiment 1 does. Consequently, only the difference from Embodiment 1 is described. FIG. 21 illustrates a distribution setting sequence diagram of application update in Embodiment 4. FIG. 21 illustrates the difference from FIG. 5 in Embodiment 1. Portions of the same processes as those in Embodiment 1 are assigned the same numerals as those in FIG. 5.

In FIG. 21, in a range encircled by broken lines 606, the device 400 repeats the sequence according to a response result returned from the distribution system 10 in the process 464. In a range encircled by broken lines 600, the presence or absence of the process is changed according to a notification content from the device 400 received in the process 462. In the case where application update notification from the device 400 indicates a failure and the case where the activation state before update of the target application in the device 400 is "ACTIVE", the distribution system 10 performs distribution setting indicated by a process 601. This setting is distribution setting of the original version of the application to return the application to the version before update. Thus, at timing of the next distribution setting confirmation (process 445), the application can be returned to that having the original version and having normally operated.

In a response of the process 464, the distribution system 10 includes the instruction of any of "ACTIVATION", "STOP" and "MAINTAIN STATE" of the application in the response and returns the response to the device 400. In ranges encircled by broken lines 602 and 604, the details and presence or absence of the process in the device 400 are changed according to the content of the response from the distribution system 10. A process 603 indicates that the device 400 performs the application stop process. A process 605 indicates that the device 400 performs the application activation process. The presence or absence of the process and the determination process are described with reference to the following flowchart.

Figure 22:
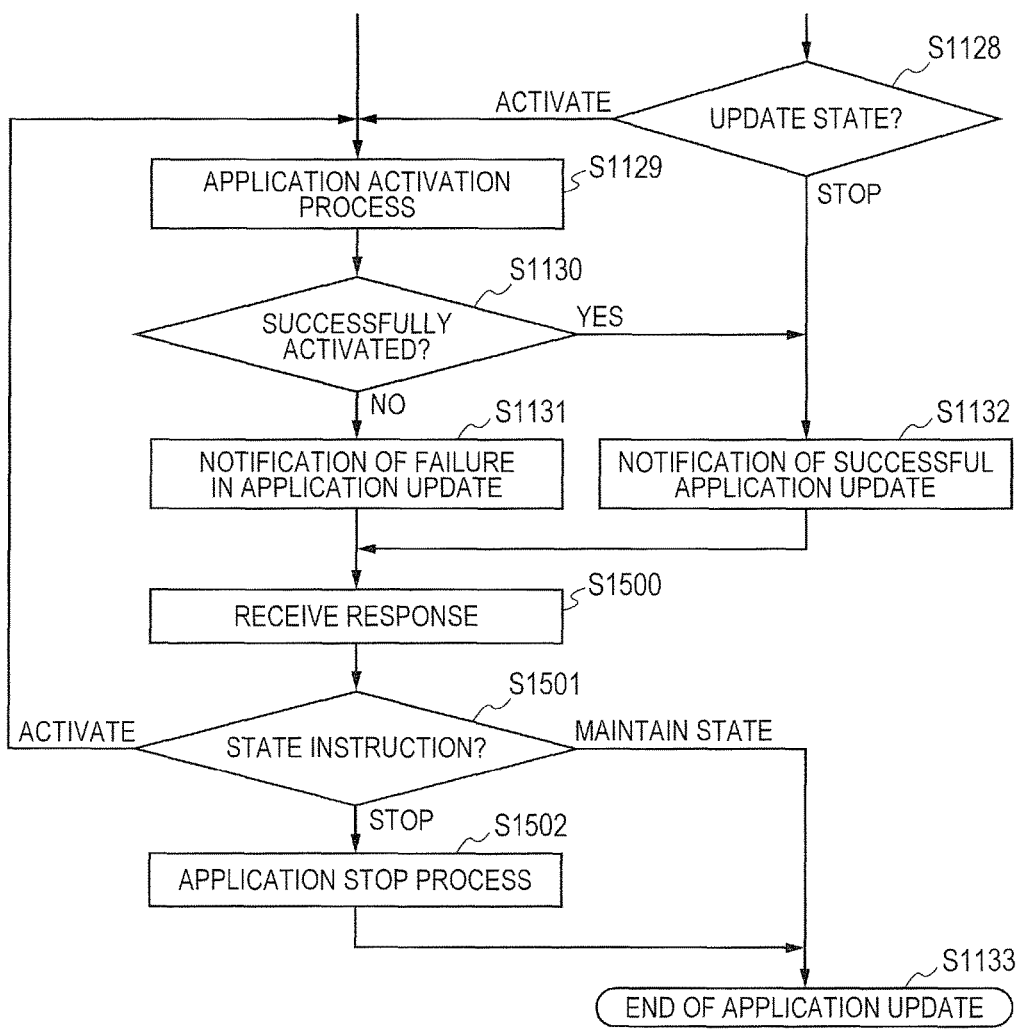
FIG. 22 is a flowchart of an application updater in a device in Embodiment 4.

FIG. 22 illustrates an example of a flowchart of the application update process of the device 400 in Embodiment 4. FIG. 22 illustrates the difference from FIG. 16. Portions of the same processes as those in Embodiment 1 are assigned the same numerals as those in FIG. 16.

The device 400 issues the update notification in S1131 and S1132 and subsequently receives a response from the distribution system 10 (S1500). In S1501, the process is branched according to the state instruction from the distribution system 10. When the state instruction from the distribution system 10 is "ACTIVATE", the processing returns to S1129 and the application activation process is performed again. When the state instruction is "STOP", the processing proceeds to S1502, the application stop process is performed and the application update process is finished. When the state instruction is "MAINTAIN STATE", the update process of the application is finished as it is.

Figure 23:
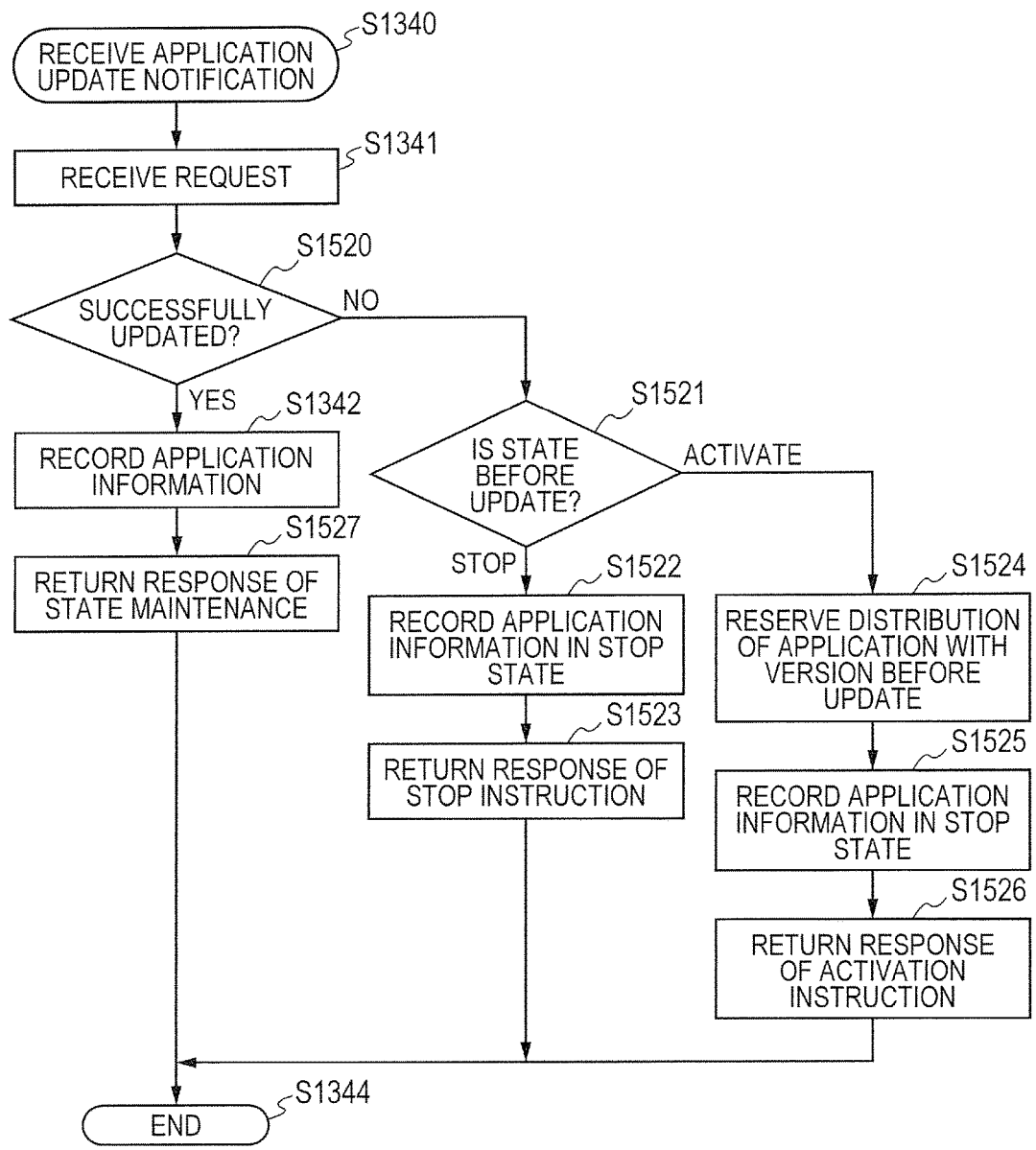
FIG. 23 is a flowchart of a process for an application update notification request in Embodiment 4.

FIG. 23 illustrates an example of a flowchart of a process for an application activation state notification request in the distribution system 10 in Embodiment 4. FIG. 23 replaces FIG. 18 in Embodiment 1. Portions of the same processes as those in Embodiment 1 are assigned the same numerals as those in FIG. 18.

According to the content of the notification received in S1341, it is determined whether the update is succeeded in S1520 or not. When the update is successful, the processing proceeds to S1342, and the state information on the application is updated and subsequently includes the instruction of "MAINTAIN STATE" in a response and returns the response in S1527. When the update fails, the processing proceeds to S1521. In S1521, the installed application management table 335 is searched, and the processing is branched according to the activation state before update of the target application in the target device. In the case where the state before update is "STOP", the processing proceeds to S1522. In the case where this state is "ACTIVATE", the processing proceeds to S1524.

In S1522, the installed application management table 335 is updated in the stop state. In S1523, "STOP" instruction for the target application is included in a response and this response is returned to the device 400. In S1524, the installed application management table 335 is searched, and the version of the application before update of the target application in the target device is obtained. The application distribution management table 336 is updated, and a reservation for distributing the application with the version before update is made. Furthermore, in S1525, the installed application management table 335 is updated in the stop state. In S1526, "ACTIVATE" instruction of the target application is included in a response and this response is returned to the device 400. The update is performed in the "STOP" state in S1525 not to issue a further activation instruction in case the application reactivation fails in the device 400.

As described above, even if the activation after application update in the device fails, the instruction is transmitted from the distribution system. Consequently, according to a determination by the distribution system, the state can be returned to an appropriate operation state and a normal version.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-150554, filed Jul. 30, 2015, which is hereby incorporated by reference herein in its entirety.

What is claimed is:

1. A distribution system comprising,
a memory storing instructions; and
a processor executing the instructions causing the distribution system to:
obtain identification information and version information on each of firmware and an application that are installed in a plurality of network devices;
switch a screen displayed by a web browser between a first screen for first distribution setting pertaining to the firmware and second screens for second distribution setting pertaining to the application, based on the obtained information, wherein the first screen is not enabled to designate an operating state of the firmware after update of the firmware as the first distribution setting;
receive, through the second screens, designations of identification information on each of the network devices, the application to be distributed and an operating state of the application after distribution as the second distribution setting, wherein the operating state is one of activation, stop, and maintenance of a state before update of the application;
transmit, to each of the network devices, any of the first distribution setting designated through the displayed first screen and the second distribution setting designated through the displayed second screen;
transmit, in response to a request from each of the network devices to which the first distribution setting is transmitted, a first Uniform Resource Locator (URL) for downloading a file of firmware to be updated; and
transmit, in response to a request from each of the network devices to which the second distribution setting is transmitted, a second URL for downloading a file of application to be updated;
wherein each of the network devices to which the second distribution setting is transmitted is configured to:
(1) perform, if the designation of the operating state included in the second distribution setting is the activation, a processing of activating of the application after update of the application to be distributed to transmit an update success notification to the distribution system in response to a success of the processing of activating of the application;
(2) perform, if the designation of the operating state included in the second distribution setting is the maintenance of the state and the state before update of the application is the activation, the processing of activating the application after update of the application to be distributed to transmit an update success notification to the distribution system in response to the success of the processing of activating of the application;
(3) transmit, if the designation of the operating state included in the second distribution setting is the stop, the update success notification to the distribution system without performing the processing of activating of the application after update of the application to be distributed; and (4) transmit, if the designation of the operating state included in the second distribution setting is the maintenance of the state and the state before update of the application is the stop, the update success notification to the distribution system without performing the processing of activating the application after update of the application to be distributed.

2. The distribution system according to claim 1, wherein the second distribution setting includes installation and update of the application, and the first distribution setting includes update of the firmware.

3. The distribution system according to claim 1, wherein the instructions further cause the distribution system to receive, through the first screen, destination identification information on the network device and the firmware to be distributed as the first distribution setting.

4. The distribution system according to claim 1,
wherein the instructions further cause the distribution system to obtain the operating state of the application installed in the network device, and
wherein the identification information, version information and the operating state of the application are displayed on the second screens.

5. The distribution system according to claim 1, wherein any of the first and second distribution setting includes designation of distribution date and time.

6. A distribution method carried out in a distribution system, the method comprising:
obtaining identification information and version information on each of firmware and an application that are installed in a plurality of network devices;
switching a screen displayed by a web browser between a first screen for first distribution setting pertaining to the firmware and second screens for second distribution setting pertaining to the application, based on the obtained information, wherein the first screen is not enabled to designate an operating state of the firmware after update of the firmware as the first distribution setting;
receiving, through the second screens, designations of identification information on each of the network devices, the application to be distributed and an operating state of the application after distribution as the second distribution setting, wherein the operating state is one of activation, stop, and maintenance of a state before update of the application;
transmitting, to each of the network devices any of the first distribution setting designated through the displayed first screen and the second distribution setting designated through the displayed second screen,
transmitting, in response to a request from each of the network devices to which the first distribution setting is transmitted, a first Uniform Resource Locator (URL) for downloading a file of firmware to be updated; and
transmitting, in response to a request from each of the network devices to which the second distribution setting is transmitted, a second URL for downloading a file of application to be updated;
wherein each of the network devices to which the second distribution setting is transmitted is configured to:
(1) perform, if the designation of the operating state included in the second distribution setting is the activation, a processing of activating of the application after update of the application to be distributed to transmit an update success notification to the distribution system in response to a success of the processing of activating of the application;

(2) perform, if the designation of the operating state included in the second distribution setting is the maintenance of the state and the state before update of the application is the activation, the processing of activating the application after update of the application to be distributed to transmit an update success notification to the distribution system in response to the success of the processing of activating of the application;

(3) transmit, if the designation of the operating state included in the second distribution setting is the stop, the update success notification to the distribution system without performing the processing of activating of the application after update of the application to be distributed; and (4) transmit, if the designation of the operating state included in the second distribution setting is the maintenance of the state and the state before update of the application is the stop, the update success notification to the distribution system without performing the processing of activating the application after update of the application to be distributed.

7. A non-transitory computer-readable storage medium storing a program that causes a computer to execute a distribution method carried out in a distribution system,
the distribution method comprising:
obtaining identification information and version information on each of firmware and an application that are installed in a plurality of network devices;
switching a screen displayed by a web browser between a first screen for first distribution setting pertaining to the firmware and second screens for second distribution setting pertaining to the application, based on the obtained information, wherein the first screen is not enabled to designate an operating state of the firmware after update of the firmware as the first distribution setting;
receiving, through the second screens, designations of identification information on each of the network devices, the application to be distributed and an operating state of the application after distribution as the second distribution setting, wherein the operating state is one of activation, stop, and maintenance of a state before update of the application;
transmitting, to each of the network devices any of the first distribution setting designated through the displayed first screen and the second distribution setting designated through the displayed second screen;
transmitting, in response to a request from each of the network devices to which the first distribution setting is transmitted, a first Uniform Resource Locator (URL) for downloading a file of firmware to be updated; and
transmitting, in response to a request from each of the network devices to which the second distribution setting is transmitted, a second URL for downloading a file of application to be updated;
wherein each of the network devices to which the second distribution setting is transmitted is configured to:
(1) perform, if the designation of the operating state included in the second distribution setting is the activation, a processing of activating of the application after update of the application to be distributed to transmit an update success notification to the distribution system in response to a success of the processing of activating of the application;

(2) perform, if the designation of the operating state included in the second distribution setting is the maintenance of the state and the state before update of the application is the activation, the processing of activating the application after update of the application to be distributed to transmit an update success notification to the distribution system in response to the success of the processing of activating of the application;

(3) transmit, if the designation of the operating state included in the second distribution setting is the stop, the update success notification to the distribution system without performing the processing of activating of the application after update of the application to be distributed; and (4) transmit, if the designation of the operating state included in the second distribution setting is the maintenance of the state and the state before update of the application is the stop, the update success notification to the distribution system without performing the processing of activating the application after update of the application to be distributed.

\* \* \* \* \*